(12) United States Patent
Tadepalli et al.

(10) Patent No.: US 9,068,101 B2
(45) Date of Patent: Jun. 30, 2015

(54) SIZING COMPOSITIONS AND SIZED PRODUCTS FOR THERMOPLASTIC COMPOSITES

(71) Applicant: JOHNS MANVILLE, Denver, CO (US)

(72) Inventors: Rajappa Tadepalli, Chennai (IN); Kiarash Alavi, Littleton, CO (US); Jawed Asrar, Englewood, CO (US); Klaus Friedrich Gleich, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/310,059

(22) Filed: Jun. 20, 2014

(65) Prior Publication Data

US 2014/0296377 A1 Oct. 2, 2014

Related U.S. Application Data

(62) Division of application No. 13/335,761, filed on Dec. 22, 2011, now Pat. No. 8,791,203.

(51) Int. Cl.
| | |
|---|---|
| *C08G 69/26* | (2006.01) |
| *B32B 27/04* | (2006.01) |
| *C08G 69/48* | (2006.01) |
| *C09D 177/02* | (2006.01) |
| *C08G 69/04* | (2006.01) |
| *C08G 69/14* | (2006.01) |
| *C08J 3/20* | (2006.01) |
| *C08K 7/14* | (2006.01) |

(52) U.S. Cl.
CPC .............. *C09D 177/02* (2013.01); *C08G 69/04* (2013.01); *C08G 69/14* (2013.01); *C08J 3/203* (2013.01); *C08K 7/14* (2013.01)

(58) Field of Classification Search
None
See application file for complete search history.

(56) References Cited

U.S. PATENT DOCUMENTS

| | | | |
|---|---|---|---|
| 5,240,974 A | 8/1993 | Lechner et al. | |
| 5,604,270 A | 2/1997 | Klett et al. | |
| 2010/0203331 A1* | 8/2010 | van der Woude et al. | .... 428/391 |
| 2010/0280239 A1 | 11/2010 | Shooshtari et al. | |

* cited by examiner

*Primary Examiner* — Susannah Chung
*Assistant Examiner* — Robert T Butcher
(74) *Attorney, Agent, or Firm* — Robert D. Touslee

(57) ABSTRACT

Sizing compositions to size fibers or particles used in plastic composites are described. The compositions may include a solution with a polymerization compound selected from: (a) at least one non-isocyanate-containing polymerization initiator (PI) for initiating the polymerization of caprolactam monomers; or (b) at least one precursor for a non-isocyanate-containing PI for initiating the polymerization of caprolactam monomers. Methods of making the sizing the composition, as well as methods of making reinforced thermoplastic composites from sized fibers or particles, are also described.

20 Claims, 6 Drawing Sheets

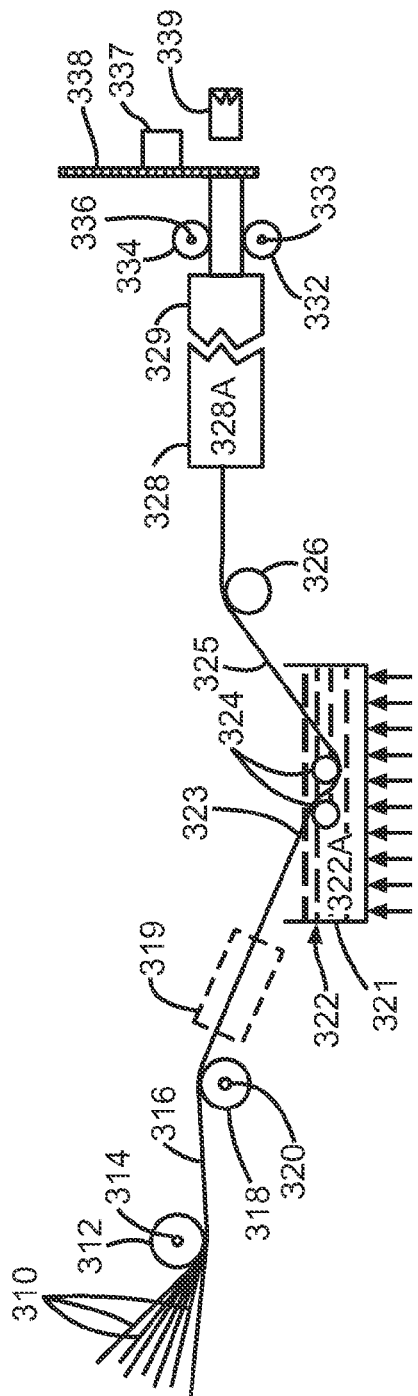
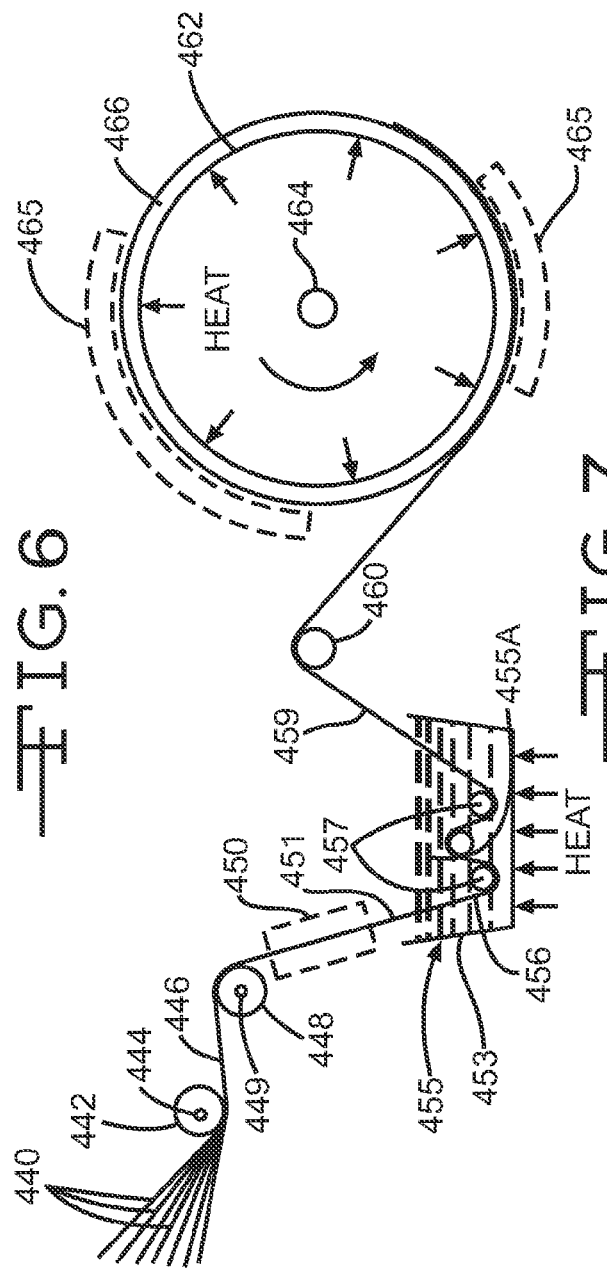
FIG. 6
FIG. 7

SIZING COMPOSITIONS AND SIZED PRODUCTS FOR THERMOPLASTIC COMPOSITES

This patent application is a division of pending U.S. patent application Ser. No. 13/335,761 filed Dec. 22, 2011.

CROSS-REFERENCES TO RELATED APPLICATIONS

This application is related to co-assigned U.S. patent application Ser. No. 12/913,326 filed Oct. 27, 2010; Ser. No. 12/881,736 filed Sep. 14, 2010; Ser. No. 12/724,024 filed Mar. 15, 2010; and Ser. No. 12/008,041 filed Jan. 8, 2008. The entire contents of all the above-identified applications are herein incorporated by reference for all purposes.

FIELD OF THE INVENTION

Reactive sizing compositions for fibers and flakes are described that allow the fibers and flakes to participate in polymerization reactions with resin compositions to form fiber (and/or flake) reinforced composites. The composites may be used in a variety of applications, including building materials such as reinforced mats, tubing, and part components, among other applications.

BACKGROUND OF THE INVENTION

Forming processes are used to make large and/or structural glass fiber reinforced composite (GFRC) parts. Such processes include RIM (Reactive Injection Molding), SRIM (Structural Reactive Injection Molding), RTM (Resin Transfer Molding), VARTM (Vacuum Assisted Resin Transfer Molding), SMC (Sheet Molding Compound), BMC (Bulk Molding Compound), spray-up forming, filament winding, LFI (Long Fiber Injection molding) and pultrusion.

In injection molding processes, chopped glass fibers, and/or flakes and/or particles of stabilizing filler, and/or coloring pigments and pellets of a thermoplastic polymeric resin are fed into an extruder mix the two together at elevated temperature and maceration due to the high viscosity of the molten thermoplastic polymer(s) or copolymer(s). Substantial working and maceration is important and sometimes necessary to wet out the glass fibers at the elevated temperature due to the high viscosity, and as a result the glass fibers are shortened significantly. The resultant mixture is formed into a molding material that is supplied to a press or injection molding system to be formed with very expensive tooling into GFRC parts. During the extrusion process using single or twin-screw machines, the resin is heated and melted and the fibres are dispersed throughout the molten resin to form a fibre/resin mixture. Next, the fibre/resin mixture may be degassed, cooled, and formed into pellets or slugs. The dry fibre strand/resin dispersion pellets are then fed to a moulding machine and formed into moulded composite articles that have a substantially homogeneous dispersion of glass fibre strands throughout the composite article. Alternatively, in the process using continuous filaments, fibreglass filaments are mixed with the molten resin in an extruder with the screw geometry designed to mix the matrix with fibres without causing significant damage to the fibres. The resultant extruded mixtures are then compression molded to form long-fibre reinforced thermoplastic parts having superior mechanical properties due to the nature of the orientation and the longer length of the fibers. Because of these difficulties, the use of thermoplastics to make vehicle parts was very limited.

With the newly proposed challenging CAFE gas mileage standards being introduced, there is a larger than ever need for lighter weight vehicle parts that thermoplastic fiber reinforced composite (TPFRC) could satisfy, because TPFRC scrap is recyclable. The thermoplastic polymers or copolymers may be melted and reclaimed, and ground thermoplastic TPFRC may be used in thermoplastic forming processes including injection molding, extrusion, etc. Thus, there is a large need for TPFRC parts using normally thermoset processes including RIM, SRIM, RTM, VARTM, LFI, SMC, BMC, spray-up hand lay-up etc., and also improved materials for extrusion and for injection molding. Additionally, there is a need for materials that will undergo no, or a very minimum, branching or cross-linking polymerization during extrusion processing or in the injection molding equipment prior to entering and being formed in the mold(s). Currently, such tendency to form branching and/or cross-linking polymerization in these processes while in the extruder and/or in the injection molding system prior to the mold when using reactive materials causes increases in viscosity and shear resistance that is extremely costly if not prohibitive to the use of such reactive materials in these processes. Thus, there is a need for methods of polymerizing and forming thermoplastic polymers, copolymers and homopolymers in situ surrounding the fiber reinforcements in a mold.

Low viscosity caprolactam monomers, one containing an activator and another mixture containing a caprolactam monomer and a catalyst may be cast by mixing the two very low viscosity mixtures together prior to casting. However, this mixture may be kept to less than about 100° C. to prevent rapid polymerization. Following casting, the cast mixture is heated in the mold to cause anionic poylmerization of the monomer to produce a polyamide. However, this method is not practical for most vehicle and large parts and many other current thermoset parts because of the relatively low temperature limitation and the time delays that are caused in the forming and polymerizing cycle. If TPFRC is to replace metals or thermoset fiber reinforced composites (TSFRC) substantially in the automotive industry and elsewhere, economical method(s) need to be found that will produce such automotive parts of equal or superior performance at competitive costs with metal and TSFRC parts now in use. This and other challenges are addressed in the present application.

BRIEF SUMMARY OF THE INVENTION

Sizing compositions comprising one or more polymerization iniatiators (PIs) or catalysts in a liquid such as water are described. The function of a catalyst, sometimes called a promoter, is to initiate and speed up the polymerization reaction. Sizing compositions containing one or more PI(s), or precursors thereof which may be contained in an appropriate concentration in water are also described. Exemplary PI(s) and catalysts are described below.

The PI(s) and/or catalyst(s) on the surfaces of the fibers and/or flakes and/or particles may be chemically bonded to the surfaces with a coupling agent, or physically bonded to the surfaces with a film former, and the PI(s) and catalyst(s) may also be encapsulated in a resin or polymer and these bonded to the surfaces of the fibers and/or flakes and/or particles. The sizing compositions may also contain other additives used in sizing compositions including one or more lubricants, surfactants, biocides, fungicides, anti-foam agents and film formers.

As an alternative to the embodiments described above, further embodiments in which the sizing contains a silane chemically bonded to a one or more PI(s) instead of the PI being a separate compound, and the optional organo-silane coupling agent being separate compounds are described. In these embodiments the silane is chemically bonded to the fibers, etc., particularly to fibers, etc. containing silica or a compound containing silica, and the activator will become bonded, for example, chemically bonded, to the polymer matrix providing for greater interfacial strength between the reactive reinforcing fibers and/or the reactive flakes and/or the reactive particles and the polymer matrix.

Also described are embodiments in which instead of the sizing containing one or more PI(s), the sizing contains one or more precursors for the PI(s), or instead of the sizing containing one or more promoters or catalysts, the sizing contains one or more precursors for the promoter(s) or catalyst(s). Where more than one precursor may be used, one or more precursors may be present in the size composition, or one or more precursors may be present in a first size composition and the other precursor(s) may be present in a second size composition applied after the first size composition is applied with or without a drying step between the sizing applications. These sizes may also be applied to fibrous webs in the wet, nonwoven mat forming processes and the dry, nonwoven mat forming processes described earlier, and also to the woven fabric, all followed by drying to form reactive mat, scrim and fabric.

The present sizing compositions may be applied to fibers and or flakes. Flakes such as glass flakes, may be prepared by spraying the size composition onto the flakes while the flakes are stirred in a mixer that does not significantly degrade the flakes, dispersing the size over the surfaces of the flakes followed by drying the sized flakes. The reinforcing fibers used in the present embodiments for making reinforced composites may be glass fibers, any of the glass types used for reinforcing polymers—E glass is most commonly used. The reinforcing fibers need not be glass, nor do all of the fibers need to be glass. Other reinforcing fibers useful in place of all, or a portion of the glass fibers include, slag fibers, carbon fibers, ceramic fibers, alumina fibers, silica fibers, rock fibers including basalt fibers, asbestos, wollastinite fibers, fibrous talc, metal fibers and polymer fibers including fibers of aramid, polyester and polyethylene. Any combination of these fibers may also be used. Any flake or particle may be made reactive by using mixing equipment to coat the flakes and/or particles with the sizing being added before being put into the mixer, being added to the mixer before or after the flakes and/or particles or being sprayed onto or poured onto the flakes and/or particles while mixing, followed by drying to leave a residue of the sizing on the surfaces of the flakes and/or particles.

The present sizing compositions containing the PI(s) may also be applied reinforcing fibers in a secondary fiber coating application. This secondary coating application may be prior to the fibers being chopped or wound, after the fibers are dried followed by another drying step, or when the fibers are used to make a nonwoven mat, nonwoven or woven scrim or woven fabric, the sizing may be impregnated into the mat, scrim or fabric by spraying or passing an excess of sizing onto the mat with the excess passing through the mat to be collected and reused. In the case where the nonwoven mat is made by a wet process, the sizing may be applied, alone or in a binder mixture, to the wet web of fibers before drying the sized mat, and curing the binder if present. When the mat is formed by a dry process, the initiator sizing may be applied to the dry web, alone or in a binder mixture, followed by drying the mat, and curing the binder if present.

The processes used for making fiber and/or flake reinforced and/or particle stabilized and/or colored thermoplastic and thermoset composites may be used to be used to make fiber and/or flake reinforced, and/or filler stabilized and/or pigment colored thermoplastic composites in a simpler, less costly manner, and to permit reactive thermoplastic materials to be used in extrusion and injection molding processes without any significant branching or cross-linking polymerization problems. This is accomplished by placing one or more non-isocyanate polymerization initiators (PIs), sometimes called activators (PAs), or one or more precursors of such PIs, onto the reinforcing fibers or stabilizing flakes and/or stabilizing and/or coloring particles as one, or two separate coatings, and combining low viscosity mixtures of caprolactum monomer(s) containing one or more catalysts, such as a Grignard salt of caprolactam, with the fibers and/or flakes having on their surfaces a chemical sizing containing one or more activators or one or more activator precursors in one or two layers that, upon contact with the mixture of catalyst(s) and one or more monomers at an elevated temperature will form AP (anionic polyermized) Nylon. In this disclosure PI and PA have the same meaning functionally. One particularly useful Grignard salt catalyst is magnesium bromide (MgBr) aprolactam. The elevated temperatures may be optionally in the range of about 110° C. for a few minutes, up to about 5-10 minutes to complete or complete sufficiently the reaction(s) to form the activator in situ, before raising the temperature to the following higher levels. In alternative embodiments, the temperature may initially be about 140° C. to about 200° C., about 150° C. to about 180° C., or about 150° C. to about 170° C., to cause the anionic polymerization of at least about 90 percent (for example, more than 97 percent) of the monomer(s) resulting in a similar percentage of polycrystalline polyamide or other polymer. Other catalysts may include C3 to C12 magnesium halides, that may for example be derived from lactam monomers selected from the group consisting of epsilon-caprolactam and 2-pyrrolidone. Examples include epsilon-caprolactam magnesium bromide, (2-oxo-1-tetrahydroazepinyl magnesium bromide) and (2-oxo-1-pyrrolidinyl magnesium bromide). Also, the polymerization catalyst may be an alkali metal salt of the lactam or lactone monomer, such as sodium caprolactam. There may also be other auxiliary components in the polymerization mixture, e.g. co-initiators, catalysts, co-catalysts, electron donors, accelerators, sensitizers, processing aids, release agents, etc.

All of the fiber and/or flake and/or particle, and the monomer-activator mixture may be preheated to or near the desired polymerization temperature. When molds are involved, the molds may also be preheated at least above the melting point of the monomer when the monomer is solid at room temperature. After forming, the composite, in or out of the mold, may be placed in a hot environment to complete the polymerization to the desired degree. The total polymerization time will depend upon the temperature and degree of polymerization. For example, the polymerization reaction may take about 5 to about 15 minutes which may or may not include the up to about 10 minutes if the one or more polymerization activators are formed in situ on the fibers in the initial stage of impregnating the reinforcing fibers with the one or more monomers. In the latter case, if more time is needed to complete polymerization at the higher temperatures, another few minutes up to about 10 minutes may be taken because during this amount of time the reinforcements and mold temperature will be held at about 120° C. to first form the activator(s) before raising the temperature to the higher, polymerization temperatures.

The polymerization Initiator(s), PI(s) may comprise non-isocyanate compounds, and/or one or more precursors for such non-isocyanate compounds. Examples of such non-isocyanate compounds include, but are not limited to,

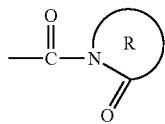

wherein

represents a C3 to C12 substituted or unsubstituted cyclic hydrocarbon chain.

Embodiments may include methods of making unreinforced polymer parts wherein N-acetyl caprolactam as a PI (about 6 mili-moles per mol of caprolactam—in combination with magnesium bromide (MgBr) caprolactam, a catalyst, (available as 1 mol per kilogram concentration in caprolactam) along with caprolactam monomer are mixed and heated to about 120-200° C. in an extruder system to produce unreinforced Nylon 6, polyamide 6, polymer slugs, or pellets for molding in matched metal die molding or by injection molding. Hereafter polymerization initiators will be referred to as PI. Sort or long fibers and/or glass flakes, with or without fillers, may be added to make reinforced and/or filled composites. The extent of polymerization in an extruder is about 93-95%. The mixture is forced out of the extruder by keeping the die zones around 200° C., causing the polymer to soften. The extruder may be used to fill a reinforcing fiber perform in a mold, or alternatively this may be accomplished by the RTM or vacuum infusion or impregnation processes. Initiators including acetyl caprolactam, isophthaloylbis caprolactam, esters such as benzoyl caprolactam, rubber modified initiators, and the like may be used. The catalysts are disclosed above.

Embodiments may further include methods of making reinforced polyamide 6 molding slugs or pellets for molding, and reinforced polyamide 6 composite parts in processes including RIM, VARIM, SRIM, pultrusion, filament winding and high pressure injection molding. In these methods two separate melting vessels may be used with one melting vessel melting a mixture of lactam monomer and one or more polymerization initiators at a temperature in the range of about 80° C. to about 160° C. and the other melting vessel melting a mixture of lactam monomer and one or more catalysts at a temperature in the range of about 80° C. to about 160° C. These two melts are then directed in separate pipes to a mixing head where they may be mixed thoroughly and then directed into one or more pipes to a heated mold, the mold containing a fibrous perform, previously made from chopped fibers, rovings, nonwoven mat(s) or woven fabric(s). To reduce molding time, the performs may be preheated to a temperature in the range of about 160° C. to about 200° C. before placing the perform into the heated mold. The mixed monomer, PI(s) and catalyst(s) impregnate the fibrous perform surrounding the fibers and polymerize due to the heat of the mold and perform at polymerization temperatures including those in the range of about 120° C. to about 200° C., forming fiber reinforced polyamide 6 composite. The amount of reinforcing fiber in these composites may be in the range of about 40 wt. percent to about 80 wt. percent.

Some embodiments include methods that are variations of the previously described methods. The variation involves first sizing or coating the fibers with a sizing composition that includes one or more PI(s) for the caprolactam and then either chopping and drying the fibers or winding and drying the fibers before they are used to make the fibrous performs. The sizing compositions may be solvent based and may use solvents such as water as the liquid carrier, and may also contain one or more fiber sizing ingredients, e.g. organo-silane coupling agents, one or more lubricants to protect the fiber surface from scratching, gouging, etc. and one or more film formers for coating the fiber and bonding the other non-water ingredients to the surfaces of the fibers. The size may contain enough PI to polymerize the mixture of monomer and catalyst that may be forced into the heated mold and heated fibrous perform. In this alternative method of making fiber reinforced polyamide 6 composites, only one melting vessel may be needed to melt the mixture of caprolactam and the one or more catalysts and this melted mixture may either go straight to the mold, or optionally may pass through a mixing head for better homogeneity.

Reinforcing fibers may include any type of fiber product used to reinforce natural or organic polymers including chopped fiber strands or pellets (agglomerates), chopped fiber rovings, chopped strands from wound cakes and assembled rovings, gun roving, chopped or long slivers, nonwoven fibrous mats and woven fiber fabrics. Glass fibers and flakes as well as other fibers and flakes including polymers, copolymers, ceramic, other inorganics including carbon fibers, metal fibers and flakes and natural fibers may be used.

As an alternative to the embodiments described above, the sizing may contain a silane chemically bonded to one or more PI(s) instead of the PI and the optional organo-silane coupling agent being separate compounds. In these embodiments the silane is chemically bonded to the fibers, particularly to fibers containing silica or a compound containing silica, and the activator may become bonded, often chemically bonded, to the polymer matrix providing for greater interfacial strength between the reinforcing fibers and the polymide 6 polymer matrix.

Embodiments may still further include a sizing that contains one or more precursors for the PI instead of the sizing containing one or more PI(s). Where more than one precursor may be used, one or more precursors may be present in the size composition, or one or more precursors may be present in a first size composition and the other precursor(s) may be present in a second size composition applied after the first size composition is applied with or without a drying step between the sizing applications. These sizes may also be applied to fibrous webs in the wet, nonwoven mat forming processes and the dry, nonwoven mat forming processes disclosed earlier, and also to the woven fabric, all followed by drying.

The present sizing compositions may be used for the reactive reinforcing fibers described above as well as the resulting sized reactive reinforcing fiber products. Embodiments may further include additional methods of applying the sizing containing the polymerization initiator(s), PI(s), to the reinforcing fibers in a secondary fiber coating application. This secondary coating application may be prior to the fibers being chopped or wound, after the fibers are dried followed by another drying step, or when the fibers are used to make a nonwoven mat, nonwoven or woven scrim or woven fabric, the sizing may be impregnated into the mat, scrim or fabric by spraying or passing a excess of sizing onto the mat with the excess passing through the mat to be collected and reused. In the case where the nonwoven mat is made by a wet process, the sizing may be applied, alone or in a binder mixture, to the wet web of fibers before drying the sized mat, and curing the binder if present. When the mat is formed by a dry process, the PI(s) sizing may be applied to the dry web, alone or in a binder mixture, followed by drying the mat, and curing the binder if present. Embodiments include each of these methods of making fibrous performs in which the fibers are coated with one or more PI(s) as disclosed above. When the reactive fiber preforms are made to shape by a wet process, the sizing containing the PI may be in the water of the slurry, or may be sprayed onto the perform in excess after the wet preform has been formed and the excess sucked through the preform as in the mat application. Where the preform is made by hand lay-up or spray-up, the sizing containing the PI with or without a binder, may be sprayed onto the collected chopped fibers, strands or rovings as the thickness of the preform is being built up.

Reactive fillers and/or pigments may be used in place of or in addition to the reactive fibers and/or flakes, and with non-reactive fibers and/or non-reactive flakes. The fibers, flakes, filler particles and pigment particles may be of any material used to reinforce, stabilize and/or color and/or to texture thermoplastic and thermoset composite parts or products. Reactive flakes, including glass flakes, and reactive particles of fillers and reactive pigments, when used in the present embodiments requiring a sizing on the surfaces of the flakes and particles, may be prepared by spraying the size composition onto the flakes and particles while the flakes and particles are stirred in a mixer that does not significantly degrade the flakes or particles, dispersing the size over the surfaces of the flakes and particles, followed by drying the sized flakes and particles to prevent clumping, or dried and run through a device to break down any clumps and to screen for desired particle size. Exemplary reinforcing fibers used for making reinforced composites may be glass fibers, any of the glass types used for reinforcing polymers, and E glass. The reinforcing fibers need not be glass, nor do all of the fibers need to be glass. Other reinforcing fibers that may be used in place of all, or a portion of the glass fibers include, slag fibers, carbon fibers, ceramic fibers, alumina fibers, silica fibers, rock fibers including basalt fibers, asbestos, wollastinite fibers, fibrous talc, metal fibers and polymer fibers including fibers of aramid, polyester and polyethylene. Any combination of these fibers may also be used.

Herein, when a range of number values is disclosed it is to be understood by those of ordinary skill in the appropriate art(s) that each numerical value in between the upper limit and the lower limit of the range is also disclosed, to at least 0.01 of a full number. Thus, in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies may vary some beyond that stated so long as the advantages of the invention are realized. Practically, there is rarely the time or resources available to very precisely determine the limits of all the parameters of one's invention because to do so would require an effort far greater than may be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed, the inventor and others may, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 6 is a simplified schematic drawing of a modified pultrusion system according to embodiments of the invention.

FIG. 7 is a simplified schematic drawing of a modified filament winding system according to embodiments of the invention.

DETAILED DESCRIPTION OF THE INVENTION

Figure 1:
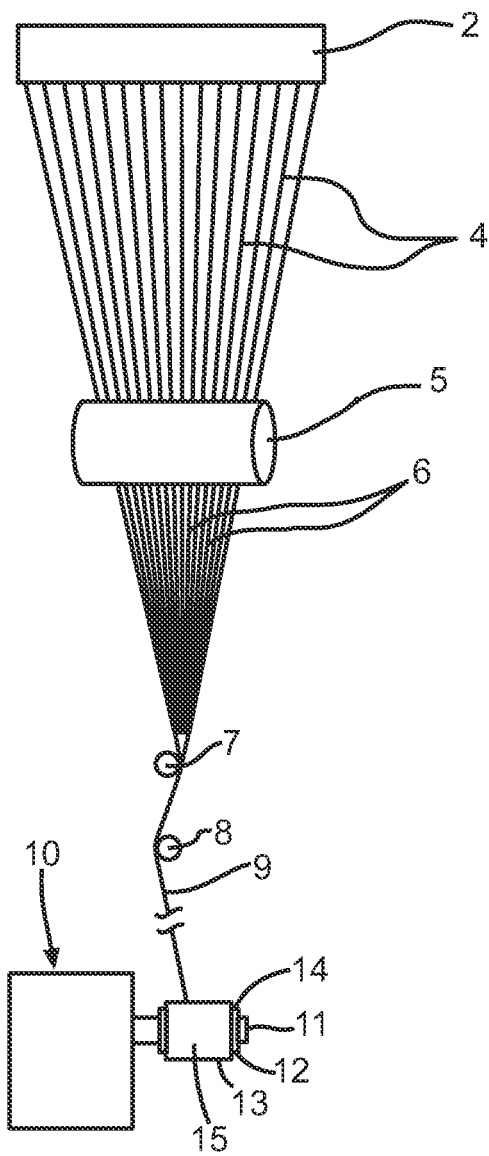
FIG. 1 is a simplified schematic drawing of a continuous glass fiber manufacturing system for making wound, reinforcing fiber products according to embodiments of the invention.

Cross-linking and branching issues in the polymerization of Nylon 6, polyamide 6, may be avoided by the use of non-isocyanate polymerization initiators such as acyllactams in combination with a Grignard salt of caprolactam as a catalyst. Using such a system results in a rapid polymerization reaction, a clean polymerization without any by products, and a crystalline polyamide 6 polymer. An example of such a system is the use of N-acetyl caprolactam as the initiator A Grignard salt of lactam may be useful as a catalyst. A Grignard salt of a lactam may be safely made in one reaction operation by reacting a metal Mg with an alkyl halide or an aryl halide and a lactam. A lactam shown by the formula I (R is a 3-11C aliphatic hydrocarbon residue) may reacted with metal Mg and an alkyl halide or an aryl halide at $-15$-$120°$ C., to give a compound shown by the formula II (n is 3-11; Y is Cl, Br, or I). Metal Mg having a small amount of oxidized film on the surface and $>/=90\%$ purity may be used as the metal Mg, and it may be in a form such as a flake, or powder, etc. having a large specific surface area. A monohalogenated hydrocarbon may be used as the halogenated hydrocarbon, and the amount used may be 1.0-1.5 mol based on 1 mol metal Mg. An amount of the lactam used may be 0.9-5 mol based on 1 mol metal Mg.

Chemical sizings applied to the surfaces of the fibers, particularly glass fibers and fibers containing silica and alumina, may contain a lubricant, a film former, and a silane coupling compound. The lubricant protects the surface of the fibers, which is essential to maximize the strength of the fibers and protect the fibers from scratches, etc. caused by fiber-to-fiber rubbing abrasion and processing equipment. The silane acts as the chemical linking agent by bonding to the glass fiber and also to the polymer/copolymer matrix. Silanes containing organosilane groups may act as coupling agents for glass fibers and an organic (e.g. polymer) phase, and serve to covalently bond the organic groups in the compound to groups on the inorganic surfaces. The optional film former provides the desired degree of bond between the fibers in the fiber strands to avoid fuzzing and excess filamentation during processing in the fiber manufacturers operations and/or in the composite manufacturers' operations. The sizing may also contain one or more ring-opening polymerization activator compounds (PI), or one or more precursors thereof, and, in some embodiments, a linking compound capable of linking the silane compound and the PI(s) or precursor(s). Examples of linking compounds are compounds containing alkyl, aryl, and alkyl-aryl groups that may cause polymerization of the hot catalyst-monomer mixture to form a polymer matrix around and bonded to reinforcing glass fibers. The sizing composition may be applied to flakes by spraying the sizing composition onto the flakes in a fluid bed or mixer followed by drying.

The ring-opening polymerization activator may be any organic reactive group that participates in a ring-opening polymerization reaction, including anionic ring-opening polymerization, cationic ring-opening polymerization and ring-opening metathesis polymerization (ROMP). The reactive groups may participate in the polymerization by forming a reactive center where further cyclic monomers may join after opening to provide a larger polymer chain through ionic propagation. In one embodiment the activator may be a group that serves the function of an activator in the anionic ring-opening polymerization of a lactam or a lactone, e.g. the actiator may be an N-substituted imide group. Some examples of coupling activator compounds useful in the anionic ring-opening polymerization of lactams include certain N-propylsilyl-W-acyl-ureas. In another embodiment, the coupling activator compound may be 2-oxo-N-(3-(triethoxysilyl)propyl)azepane-1-carboxamide, or similar compounds, present in a range of about 1 wt. percent to about 2.5 wt. percent of the monomer.

The PI(s) may include one or more of N-acylactams, N-acetyl caprolactam, isophthalovlbiscaprolactam, which may be prepared by the reaction of a lactam with either an anhydride or an acid chloride. The PI(s) may also include condensation reaction of lactams with a suitable precursor molecule to form the structure depictd as:

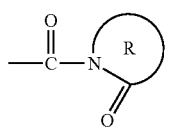

For example, caprolactam esters (e.g. benzoyl caprolactam) may be made by reacting an ester (e.g. ethyl benzoate) with caprolactam in the presentce of a 10 molar percent base catalyst such as Na-caprolactam. The PI(s) may also include reaction products of acryloyl/methacrylol caprolactam with amino/mercapto silanes or non-silane amines/thiols. The PI(s) may also include acyl caprolactam PI products made from the reaction between a ketene and caprolactam where no by-product formation is observed. Several "R" available ketenes may be used to form these PI(s).

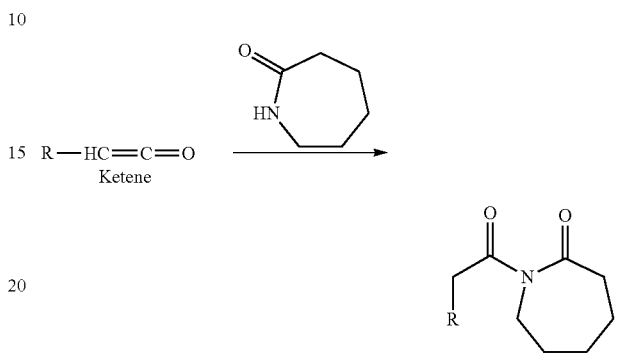

The PI(s) may also include PI(s) formed by the reaction of carbodimides with acrylic acid generating the acyl derivative and such derivative(s) may react with the caprolactam under mild conditions to form acryloyl caprolactam. Features of this reaction are, (a) acryloyl chloride may not be included in the reaction, (b) the acyl derivative is relatively stable, (c) either acryloyl caprolactam may be prepared and added to amino- or -mercapto silane, or (d) the acyl derivative may be added in situ to excess caprolactam to form the PI that may then be added to silane bonded to a glass surface or for bonding to a glass surface.

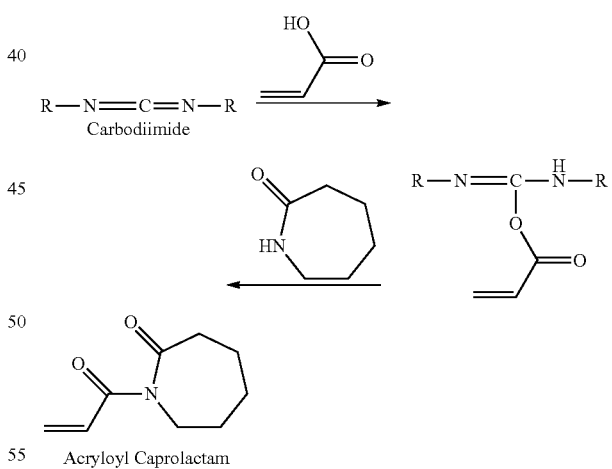

Acryloyl Caprolactam

The PI(s) may also include compounds produced by reactions schemes depicted by:

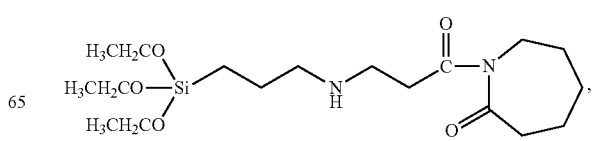

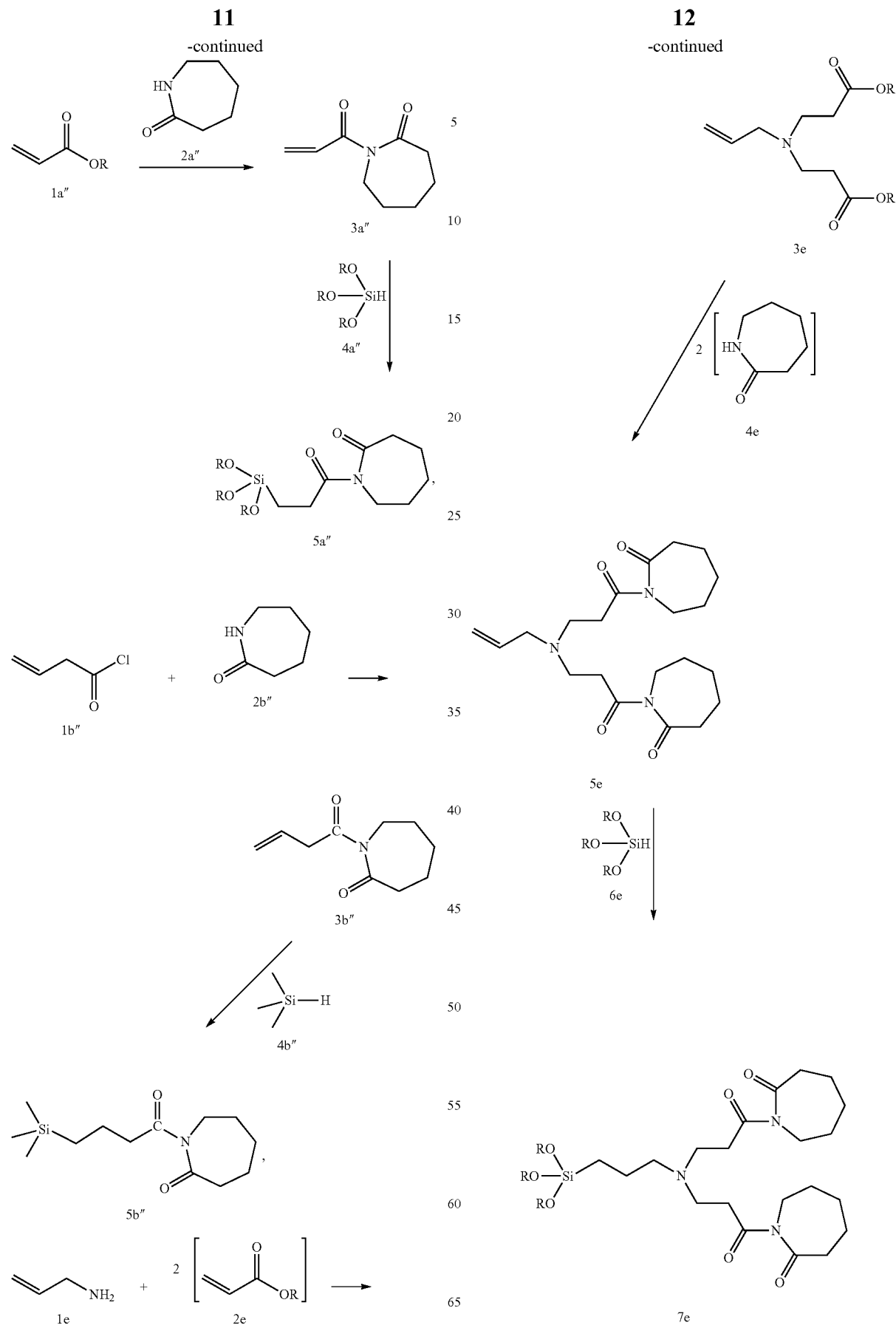

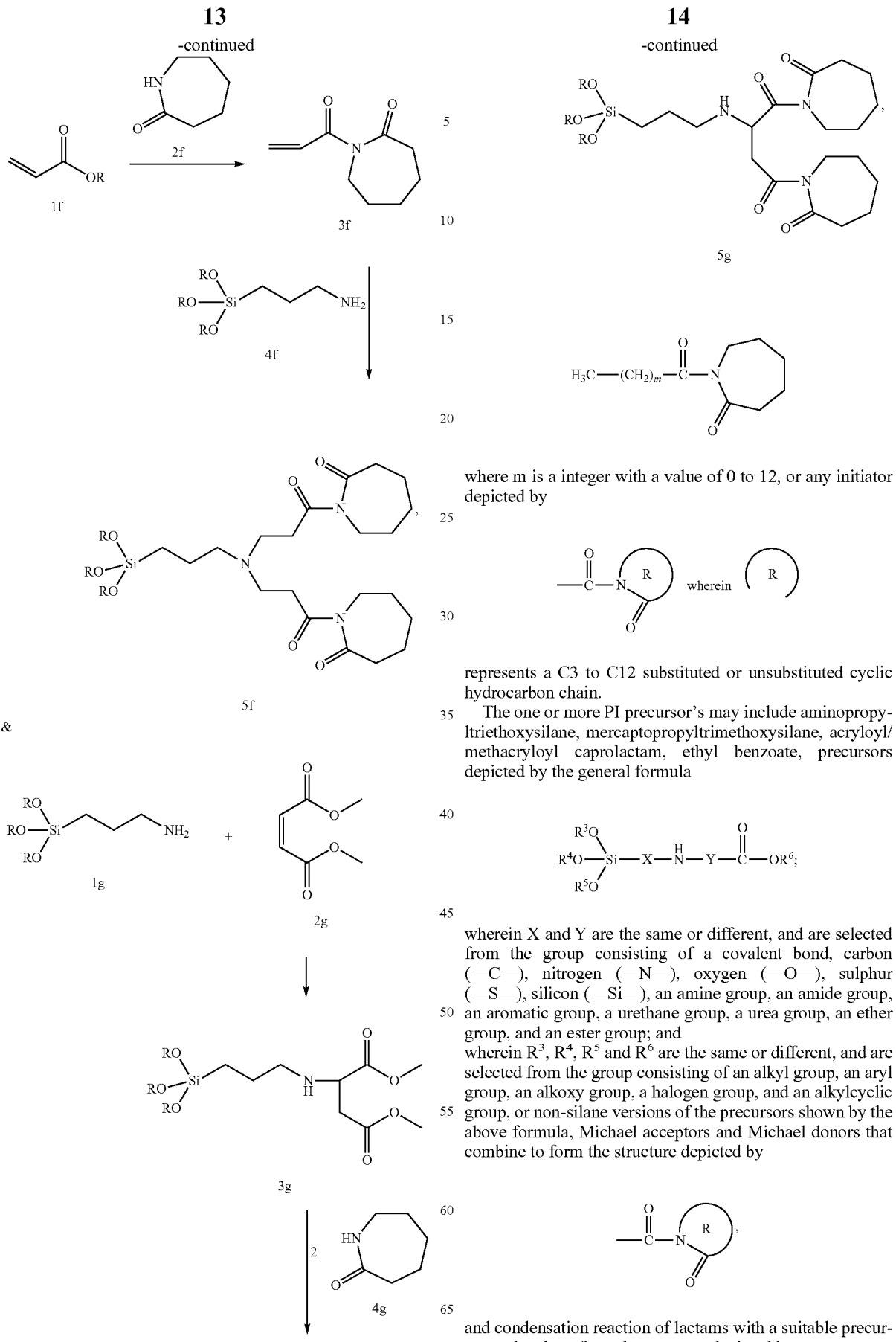

where m is a integer with a value of 0 to 12, or any initiator depicted by represents a C3 to C12 substituted or unsubstituted cyclic hydrocarbon chain.

The one or more PI precursor's may include aminopropyltriethoxysilane, mercaptopropyltrimethoxysilane, acryloyl/methacryloyl caprolactam, ethyl benzoate, precursors depicted by the general formula wherein X and Y are the same or different, and are selected from the group consisting of a covalent bond, carbon (—C—), nitrogen (—N—), oxygen (—O—), sulphur (—S—), silicon (—Si—), an amine group, an amide group, an aromatic group, a urethane group, a urea group, an ether group, and an ester group; and wherein $R^3$, $R^4$, $R^5$ and $R^6$ are the same or different, and are selected from the group consisting of an alkyl group, an aryl group, an alkoxy group, a halogen group, and an alkylcyclic group, or non-silane versions of the precursors shown by the above formula, Michael acceptors and Michael donors that combine to form the structure depicted by and condensation reaction of lactams with a suitable precursor molecule to form the structure depicted by

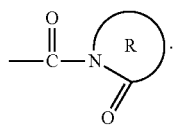

The one or more catalysts may include Grignard salts of caprolactam (e.g. MgBr-caprolactam), Na-caprolactam, K-caprolactam, alkali metal hydroxides, alcoholates, carbonates, alkylaluminums, alkalialuminum hydrides or their lactam salts, and quaternary ammonium salts of lactams. One or more precursors of catalysts may include lactams (e.q. caprolactam) and alkali hydrides (e.q. NaH).

When one or more PI(s) are present in the sizing composition, the amount of total PI solids in the sizing should be in the range of about 2 wt. percent, dry basis, to about 30 wt. percent. For example, the amount of total PI solids may range from about 5 wt. percent to about 20 wt. percent, or from about 8 wt. percent to about 16 wt. percent. When one or more catalysts are present in the sizing, the amount should be in the range of about 2 wt. percent to about 20 wt. percent, dry basis. Exemplary ranges may include from about 5 wt. percent to about 15 wt. percent or from about 8 wt. percent to about 12 wt. percent.

The sizing may include one or more coupling agents for chemically bonding the fiber to the polymer matrix. Suitable coupling agents may include aminosilanes, the reaction product of an aminosilane, maleic anhydride, ureidosilanes, vinylsilanes, and blends thereof. An exemplary silane is A1100, available from OSI Specialties. This product contains 52% by weight active silane solids following hydrolysis. Another exemplary silane that may be used is a hydrolyzed A1100 solution in water, also available from OSI Specialties under the designation VS142 (40% solution), or from Huils under the designation A1151 (40% solution). In a scenario where one or more of the PI(s) or precursors are silanes, the majority of the coupling between the organic molecules and glass is effected by the PI(s) or the precursors. Additional coupling silanes may also be used.

The size compositions may further include one or more surface modifying or coupling agents selected from functional organo silane, organo titanate and organo zirconate coupling agents. The amount of functional organo-silane coupling agent may be about 1 to about 30 wt. percent, about 4 to about 20 wt. percent, or about 6 to about 12 wt. percent of the forming size composition on a total solids basis.

The size compositions may also contain one or more lubricants to protect the surfaces of the fibers and flakes and to aid in reducing friction where the wet fibers slide past, on or over guides and other physical objects. The amount of lubricant used may be no more than about 0.15 weight percent of the size composition of a lubricant compatible with the liquid in the sizing. Suitable lubricants for this purpose may include one or more of the following: a nonionic surfactant such as a block copolymer of ethylene oxide and propylene oxide, e.g. LUVISKOL K grade and PLURONIC L101 (available from BASF of Florham Park, N.J.) or SYNPERONIC PE/IL101 (available from AkzoNobel of Morris, Ill.), polyethyleneimine polyamide salt, such as EMERY 6760 (available from Henkel Corp. of Rocky Hill, Conn.), octylphenoxypolyethoxyethanol such as TRITON X100 (available from Rohm and Haas of Philadelphia, Pa.); a polyvinyl pyrrolidone, e.g., an imidazoline, e.g., an alkylimidazoline derivative such as TEGO cationic softener (available from Th.Goldschmidt AG of Essen, Germany), amine salts of fatty acids, e.g., including a fatty acid moiety having 12 to 22 carbon atoms and/or tertiary amines having alkyl groups of 1 to 22 atoms attached to the nitrogen atom), alkyl imidazoline derivatives (formed by the reaction of fatty acids with polyalkylene polyamines), acid solubilized fatty acid amides (e.g., saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY 6717, a partially amidated polyethylene imine commercially available from Henkel Corporation of Kankakee, Ill., ALUBRASPIN 226, available from PPG Industries, Inc. of Pittsburg, Pa., alkyl imidazoline derivatives including CATION X, available from Goldschmidt Chemical Corporation (see above), ALUBRASPIN 261, available from PPG Industries, Inc. (see above), and cationic lubricants such as silylated polyamine polymers prepared by reacting: (a) an amino functional reaction product of an aminofunctional polymer having primary or secondary amine functionality and the residue of a fatty acid moiety; and (b) an amine-reactable organo alkoxy silane and hydrolysis products thereof. Other lubricants include Emerset 2646 and Emerset 2661, available from Emery Industries of Waterloo, Iowa. When one or more lubricants are used in the sizing compositions the total amount of the one or more lubricants in the size composition may be about 0.1 to about 10 weight percent, about 0.5 to about 5 weight percent, or about 1 to about 3 weight percent of the forming size composition on a total solids basis.

The size compositions may optionally include a film former for physically bonding the PI(s), PI precursor(s), catalyst(s) or catalyst precursor(s) to the fibers and flakes. A variety of film formers may be used including FULATEX PD-0166 and FULATEX PN-6019, which are both available from the H. B. Fuller Company of St. Paul, Minn. FULATEX PN-6019 is a modified vinyl acetate copolymer in an anionic/nonionic surfactant system having a solids content of 53.5 to 55.5 weight percent; a pH of 3.5 to 4.5, a viscosity of 100 to 600 cps, and a residual monomer content of 0.5% or below. Another exemplary film former is VINAMUL™ 88127, which is available from Vinamul U.K. or from National Starch under the product code N.S. 25-1971. This copolymer may contain from 53.5 to 55.5% by weight solids, have a pH of 4 to 5, and a viscosity of from 100 to 400 mPa·s. The film-forming material may also be one or more N-vinyl amide polymers prepared from a cyclic monomer, for example N-vinyl-2-pyrrolidone, N-vinyl-2-piperidone, N-vinyl-.epsilon.-caprolactam, N-vinyl-5-methyl-2-pyrrolidone, N-vinyl-3,3,5-trimethyl-2-pyrrolidone, N-vinyl-3-methyl-2-pyrrolidone, isomers, derivatives and mixtures thereof. Epoxy film formers such as Neoxil™965, available from DSM Composite Resins AG of Schaffhausen, Switzerland are suitable as are polyurethane-based film formers including Hydrosize™ U1-01/U6-01 available from Hydrosize Technologies, Inc. of Raleigh, N.C. When one or more film formers are present in the size compositions the total amount of film former present may be about 0.5 to about 15 wt. percent, about 1 to about 10 wt. percent, or about 1 to about 5 wt. percent of the forming size composition on a total solids basis.

The size compositions may also optionally contain one or more of emulsifying agents, surfactants, plasticizers, film former modifiers, and biocides among other size composition functional aids. The size may also include a pH adjusting agent, such as an acid or a base, in an amount sufficient to achieve a desired pH, for example, a pH of about 6 to about 8.5. Exemplary acids may include acetic, citric, sulfuric, phosphoric and similar acids. Exemplary bases may include ammonium hydroxide and potassium hydroxide. Each size composition may be applied to the fibers and flakes and then dried with the dried solids of the size being present on the fibers and flakes in an amount in the range of about 0.1 to about 5 wt. percent, based on the weight of the dry fibers and flakes. Additional ranges may include about 0.5 wt. percent to about 3 wt. percent and about 1 wt. percent to about 2 wt. percent, measured by a loss on ignition (LOI) test of the fiber or flake products.

The present embodiments are applicable to a broad range of sizing compositions so long as each contains at least one appropriate PI for the monomer(s) to be used or at least precursors for the one or more PI(s), or at least one catalyst for the polymerization or at least suitable precursors for the catalyst.

The reinforcing fibers may include any type of fiber product used to reinforce natural or organic polymers including chopped fiber strands or pellets (agglomerates), chopped fiber rovings, chopped strands from wound cakes and assembled rovings, gun roving, chopped or long slivers, non-woven fibrous mats and woven fiber fabrics. The reinforcing fibers may be of any length. For example, the reinforcing fibers may be at least 0.06 inches long up to lengths exceeding 100 feet. The reinforcing fibers may be dry, but they may also contain up to about 0.5 wt. percent moisture or solvent. For example, the reinforcing fibers may contain less than 0.3 wt. percent moisture, less than 0.2 wt. percent moisture, or even less than 0.1 wt. percent moisture.

In many of the embodiments, sized fibers are made and used as reinforcements in polymers formed in situ around the sized reinforcement fibers. One system useful in making the sized reinforcing fibers in a wound form is shown in FIG. 1. Fibers 4, including glass or polymer fibers, are formed by passing a molten form of the glass or polymer, etc. through orifices or nozzles on the bottom of a refractory metal bushing 2 heated to the fiberization temperature of the material being fiberized, and the fibers 4 are pulled rapidly downward at speeds exceeding 500-1000 ft./min. to more than 10,000 ft./min to attenuate the fibers to the desired diameter and to quickly cool the fibers 4 with air to below their softening point. A fine mist of water or other cooling fluid is sprayed onto the fibers to help cool them and the fibers 2 are then pulled into contact with a chemical sizing applicator such as a roller of a chemical sizing applicator 5 where the surfaces of the fibers are coated with one of the chemical sizings of the present embodiments, or another chemical sizing. The chemical sizings may be water based, but other liquids may be used in place of water including organic solvents such as ketones, alcohols including ethanol, methanol, esters or others, molten caprolactam with or without an aqueous medium or a combination of water and organic solvents.

The chemical sizing compositions may include a liquid carrier such as water, and either one or more non-isocyanate PA or one or more precursors of one or more non-isocyanate PI and may also optionally contain one or more other functional ingredients. The sizing may contain one or more silane coupling agents, one or more lubricants to protect the surfaces of the fibers from damage, and one or more surfactants or wetting agents, etc. and may also optionally contain one or more resinous film formers for bonding the other ingredients to the fibers and also to provide a bond of desired strength between the many fibers in a strand formed by a plurality of fibers formed from a melt coming through a bushing 2 shown in FIG. 1.

The present embodiments are applicable to a broad range of sizing compositions so long as each contains at least one non-isocyanate PI for polyamide 6 or at least one precursor for such PI. As a further guide, below are a few of many possible sizing compositions that may be used in the present embodiments.

Size Composition #1:

| Ingredient | Weight % |
|---|---|
| Caprolactam silane[a] | 12 |
| Film former[b] | 1.2 |
| Lubricant[c] | 1.1 |
| Acetic Acid | 0.03 |
| Ammonium Hydroxide | 0.04 |
| Deinoized water | 85.63 |

[a]Choice of silanes such as reaction products of acryloyl caprolactam and aminopropyltriethoxysilane, or acryloyl caprolactam and mercaptopropyltrimethoxysilane, or methacryloyl caprolactam and amino/mercaptosilane, or any other trialkoxysilane containing end group specified by 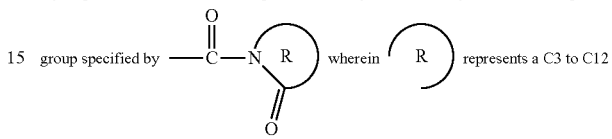 wherein R represents a C3 to C12 substituted or unsubstituted cyclic hydrocarbon chain.
[b]Choice of film formers such as Neoxil 965, Hydroside U-101/201/601 or any other Epoxy or PU-based film formers.
[c]Combination of one or more lubricants from Emerest 2646, Emerest 2661 and Emery 6717.

Procedure—
1. Add film former to ⅔ of deinoized water and stir in a mixing tank
2. Add caprolactam silane and continue stirring
3. Add acetic acid as necessary and continue stirring for an adequate period of time to ensure hydrolysis of silane (30 minutes-4 hours)
4. Add lubricants and mix for 5 minutes
5. Add the rest of the DI water
6. Add ammonium hydroxide as necessary to ensure that the target pH (7-8.5) is achieved without affecting the sizing stability
7. Record solids % and pH Size Composition #2

| Ingredient | Weight % |
|---|---|
| Initiator for AP Nylon[1] | 11 |
| Caprolactam silane[a] | 1 |
| Film former[b] | 4 |
| Lubricant[c] | 2 |
| Acetic Acid | 0.01 |
| Ammonium Hydroxide | 0.01 |
| Deinoized water | 81.98 |

[1]Choice of initiators from acetyl caprolactam, isophthaloylbiscaprolactam, acryloyl caprolactam, methacryoyl caprolactam, benzoyl caprolactam, or any other initiator containing the end group specified by 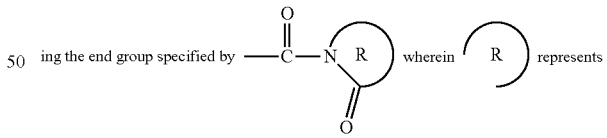 wherein R represents a C3 to C12 substituted or unsubstituted cyclic hydrocarbon chain.
[a]Choice of silanes such as reaction products of acryloyl caprolactam and aminopropyltriethoxysilane, or acryloyl caprolactam and mercaptopropyltrimethoxysilane, or methacryloyl caprolactam and amino/mercaptosilane, or any other trialkoxysilane containing end group specified by 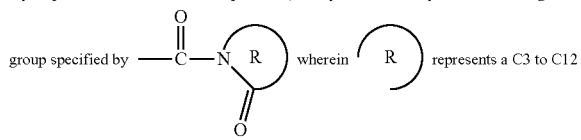 wherein R represents a C3 to C12 substituted or unsubstituted cyclic hydrocarbon chain.
[b]Choice of film formers such as Neoxil 965, Hydroside U-101/201/601 or any other Epoxy or PU-based film formers
[c]Combination of one or more lubricants from Emerest 2646, Emerest 2661 and Emery 6717

Procedure—A procedure similar to Example 1 may be followed for liquid initiators wherein the initiator is added along with caprolactam silane. For solid initiators, the film former and water mixture is heated to 90° C. and the initiator is melted first before adding to the film former-water mixture. The contents are mixed well to ensure the formation of a stable dispersion of the initiator in water. The silane is then added and the rest of the procedure is followed as per Example 1.

Size Composition #3:

| Ingredient | Weight % |
|---|---|
| Precursor for initiator for AP Nylon[2] | 8 |
| Aminopropyltriethoxysilane* | 1 |
| Film former[b] | 3 |
| Lubricant[c] | 2 |
| Acetic Acid | 0.01 |
| Ammonium Hydroxide | 0.01 |
| Deinoized water | 85.98 |

[2]Chosen from a group comprising of aminopropyltriethoxysilane, mercaptoproyltrimethoxysilane, acryloyl/methacryloyl caprolactam, ethyl benzoate or any other precursor molecules that in a secondary step react with another molecule such as caprolactam or others to produce an initiator on the surface of the glass.
*No additional silane is necessary if the precursor is a silane.
[b]Choice of film formers such as Neoxil 965, Hydroside U-101/201/601 or any other Epoxy or PU-based film formers.
[c]Combination of one or more lubricants from Emerest 2646, Emerest 2661 and Emery 6717.

Procedure—The procedure as disclosed in Example 2 is used. If aminopropyltriethoxysilane is used, the hydrolysis is rapid and acetic acid is not necessary.

The chemically coated, wet fibers are next pulled into contact with a grooved pulley 7 that gathers all of the fibers 4 from the bushing 2 into one or more strands 9. A second grooved pulley 8, either offset from the first grooved pulley 7, or with the strand(s) 9 passing on an opposite side of the pulley 8, or both to provide some additional strand tension for a winder 10 located on the floor of the forming room below and offset from bushing 2. The fiber strands 9 may contain any number of fibers from a few hundred to more than 6000.

In systems for making continuous, wound sized fibers or sized fiber strands, the fibers 4 and the fiber strands 9 may be pulled at the desired speed by a winder, such as the roving winder 10 having a rotating spindle 11 and a removable sleeve 12 on which to wind a roving package 13 having square ends 14 and a relatively smooth outer diameter 15 of a desired size. Following completion of the roving package 13, the roving winder 10 indexes to place another rotating mandrel 11 into place containing a fresh sleeve 12 and the strand(s) 9, are transferred manually or automatically to the fresh sleeve to make another roving package 13 without disrupting the pulling of the strand(s) 9. Instead of a roving winder, a different type of winder for winding cakes, bobbins or other package shapes may be used in this system. After the wet packages, etc. are removed from the winder they are dried to remove all or most of the liquid carrier, to complete any coupling reaction(s) and to cure any film former in the sizing. The dried rovings or yarns are then processed to make the reinforcing fiber and reinforcing roving and yarn products to be used to weave fabrics, to chop or to use as is in processes to make fiber reinforced polymer composite products and parts.

Figure 2:
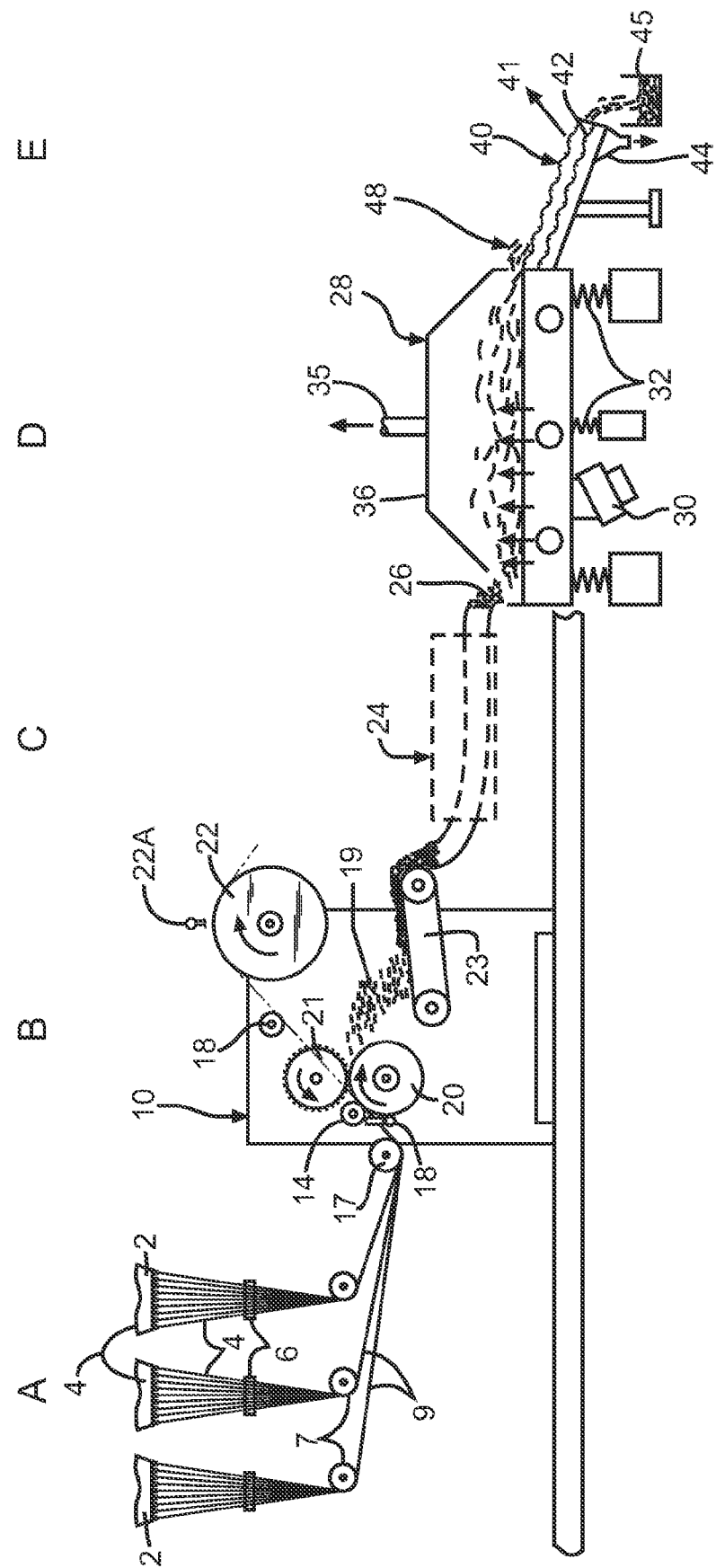
FIG. 2 is a simplified schematic drawing of a system for making desired lengths of chopped reinforcing fibers and fiber strands according to embodiments of the invention.

Other reinforcing fiber products used to make reinforced composite parts or products include wet and dry chopped sized fibers and wet and dry chopped fiber strands. FIG. 2 shows a system used to manufacture wet or dry chopped, sized fibers and fiber strands, or optionally agglomerated wet and dry chopped sized fibers and sized chopped fiber strand products. In FIG. 2, different system portions are labeled as A, B, C, D and E. Portion A is the fiber forming part of the system and may be the same as the fiber forming system shown in FIG. 1, except that in this system the fibers or strands of fibers 9 are pulled around gathering wheels 7 moving away from the turning wheels 7 in a generally horizontal orientation towards a chopper 16. Portion B is a chopper 16 for separating fibers and fiber strands 9 into lengths 19 of about 0.06 inches up to 5 inches long or longer. Exemplary fiber lengths include about 0.125 inches, about 0.25 inches, about 0.5 inches, about 0.75 inches, about 1 inch, about 1.25 inches, about 1.5 inches, etc. The chopper 16 shown in FIG. 2 is comprised of a guide roll 17, a backup roll 20 with a pulling roll 19 running against it and fibers or fiber strands 9 on the surface of the backup roll. A blade or cutter roll 21 set to cause a plurality of blades mounted in the blade roll 21 to push against the fibers or fiber strands 9 on an elastomeric surface of the backup roll 20, penetrating the elastomeric surface to some depth results in producing the desired lengths of wet, sized fibers or fiber strands 9. Other components include elements for starting a new fiber or a new fiber strand into the chopper 16 without interrupting the running fibers or fiber strands 9 and comprise an accelerating roll 22, a sensor 22A to start the accelerator roll and a strand manipulator 18 to pull the new strand into the nip between backup roll 20 and the pulling roll 19 once the new fiber or fiber strand is running at a desired speed.

The chopped fibers and/or fiber strands 19 are collected for example, on a conveyor belt or vibrating conveyor and may be either packaged wet, used wet close by, or further processed. Portion D is a drying part of the system. One option is to feed the wet, chopped fibers into a dryer like a vibrating fluid bed dryer 28, mounted on a plurality of springs 32, and equipped with one or more vibrators 30. The wet, chopped fibers and/or fiber strands are fed onto a perforated bed having holes therein of a size such that the fibers and/or fiber strands will not fall through, especially as hot air is flowing upward through the holes and into the vibrating, often suspended layer of chopped fibers and/or fiber strands to remove the liquid carrier, complete any coupling reaction(s) and to cure any film former that is on the surface of the fibers. The hot, moist air is exhausted through a stack 35, and a top cover 36 contains the fibers and fiber strands in the dryer 28.

Portion E is an optional sorting and packaging portion of the system. The hot, dry chopped fibers and/or fiber strands 48 may optionally flow into and through a size sorter 40 containing two or more screens 41 and 42 to remove any oversize and under size (fuzz) material from the desired product, discarding the material removed through a chute 44, and to cool the chopped, reinforcing fibers and/or fiber strands before being packaged in packages 45.

Portion C of the system is optional. When it is desired to produce pellets or agglomerates of the chopped fibers and/or fiber strands 19, the latter are fed into an optional agglomerator/pelletizer 24 that will agglomerate a plurality of the chopped fibers and/or fiber strands 19 into separate pellets or football shaped agglomerates and densify the pellets and/or football shaped agglomerates 26 before feeding them into the dryer 28. Optionally, the densified pellets and/or football shaped agglomerates 26 may be packaged wet for shipment or use on the premises.

Figure 3:
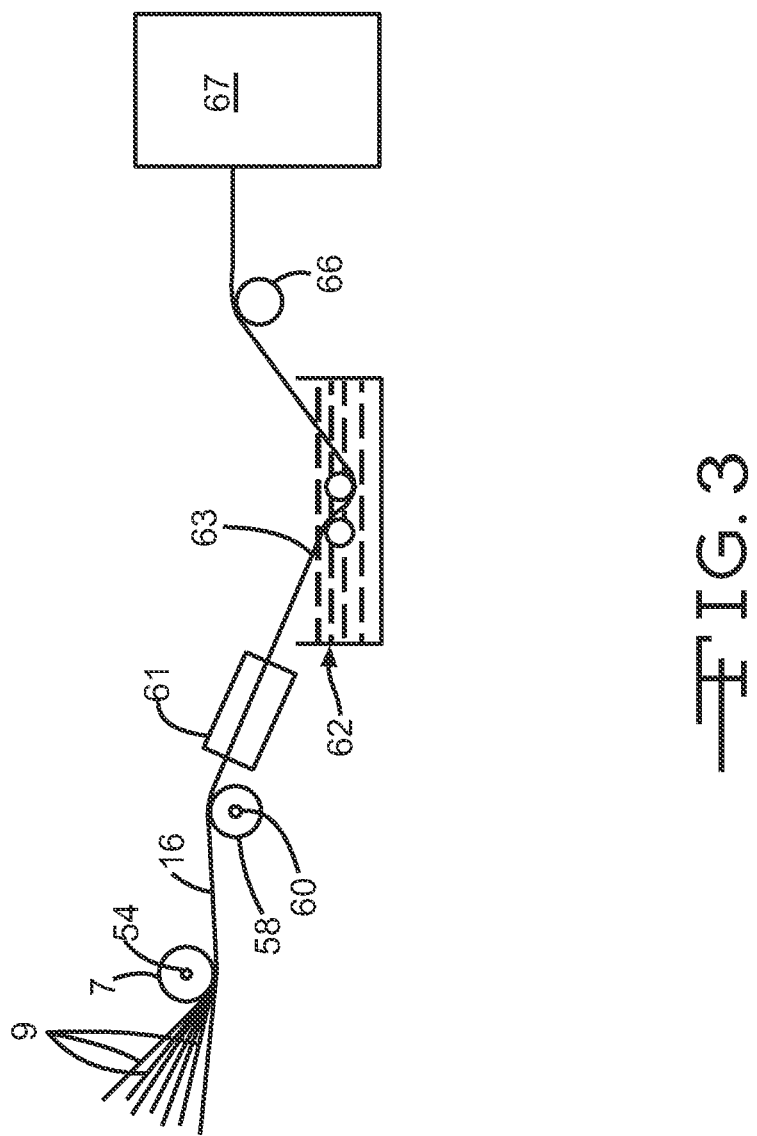
FIG. 3 is a simplified schematic drawing of a system for applying a second size composition to fibers or fiber strands according to embodiments of the invention.

Some of the sized, reinforcing fibers and/or fiber strands, particularly those using two or more precursors for the non-isocyanate PA may use a two step sizing application using different size compositions in the two sizing steps. One system for use along with a system for making first sized fibers, including the systems shown in FIGS. 1 and 2, for making such dual sized fibers and/or fiber strands is shown in FIG. 3. Here wet, sized fibers 9 sized with a sizing composition of the present embodiments, such as those coming from the systems shown in FIGS. 1 and 2, are gathered and turned with the turning roll 7 rotatable on an axle 54, then optionally onto a second roll 58 rotatable on an axle 60 and through a dryer 61 to optionally remove at least some of the liquid of the first sizing, and/or to gel the first sizing, and then onto other rollers 64 submerged in a different sizing in a container 62. The fiber(s) and/or fiber strands 65 coated with the second sizing composition are pulled from the container 62 by either a winder or chopper 67. From that point the wound or chopped sized fibers may be used, packaged wet or palletized, agglomerated and used or packaged or dried, optionally sorted, and packaged as described above in the description of FIGS. 1 and 2.

Other reinforcing fiber products include fibrous nonwoven mats and woven fiber fabrics using either the sized reinforcing fibers of the present embodiments made in the systems disclosed above, or other reinforcing fibers that are sized with the sizing compositions of the present embodiments during manufacture of the nonwoven mats and fabrics. Weaving systems may be used to weave fabrics of the present embodiments and either wet or dry mat forming systems may be used to make the fibrous, reinforcing nonwoven mats. Dry systems may include chopped strand mat systems and continuous fiber strand mat systems. These and other dry forming mat systems may be used.

Figure 4:
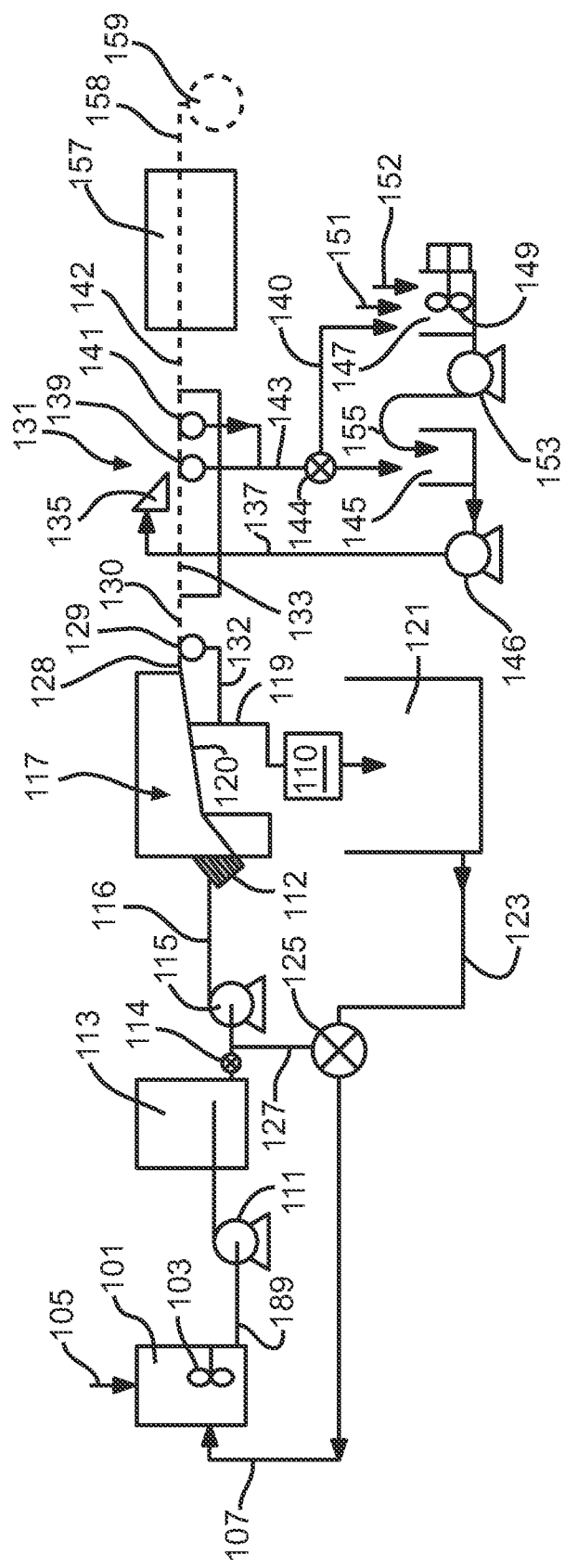
FIG. 4 is a simplified schematic drawing of a system for making a nonwoven mat and applying a sizing to fibers in the nonwoven mat according to embodiments of the invention.

FIG. 4 is a schematic of a wet former system for making multi-layer nonwoven mats except that it contains an optional second stock preparation system. Sized fibers, or reinforcing fibers and/or fiber strands, particulate or both 105 are fed, for example, continuously, but batch type preparation may also be used, into a pulper 101 containing forming liquid flowing in a return pipe 107. Mixing takes place in the pulper 101 with an agitator 103 to form a relatively concentrated slurry that exits the pulper 101 through pipe 109 and into a pump 111 that pumps the concentrated slurry into a holding tank 113. The forming liquid is delivered to pipe 107 by pump 125, pumping the forming liquid coming from a pipe 123 and a de-airing tank 121. Concentrated slurry is metered out of the holding tank 113 by a pump 115 and variable flow valve 114 where the concentrated slurry is diluted substantially with the forming liquid coming through pipe 126 to a forming pump 127. The substantially diluted slurry having for example, a solids concentration of less than about 0.04 percent, flows through pipe 116 to a distribution manifold 112 on a forming box 117.

The slurry flows toward a moving permeable forming belt 20 where the fibers and any particulates in the slurries are formed into a wet, nonwoven web while the forming water flows through the forming belt as return forming liquid 119 and onto the deairing tank 121. A final suction tube assembly 129 under the forming belt 120 near where the wet web is removed from the forming belt 120 removes excess forming liquid from the wet web and returns it through pipe 132 to the deairing tank 121. The wet web is then transferred to a second moving permeable belt 130 that carries the wet web under an applicator 135 such as a curtain coater, where a sizing with or without a binder is applied in an application section 131. Excess sizing and/or binder is removed from the wet, fibrous web or mat with suction tube assemblies 139 and 141 to reduce the sizing and/or binder level in the wet web to the desired level. The coated web is then transferred to an oven belt 142 and passed through an oven 157 where the mat is dried and any film former resin(s) in the sizing and/or binder are cured. The dry mat 158 may then be wound into a roll 159 for packaging or use nearby.

The fibers in the mats containing an optional binder are bound together with a resinous binder, but the nonwoen mat need not contain any binder other than optional film former in the sizing. The binder may be an aqueous mixture of water and one or more resins or polymers and other additives in a solution, emulsion or latex. The sizing, binder, or combination is prepared by adding one or more ingredients 151 with a liquid 152 such as water, to a mix tank 147 containing an agitator 149. Excess binder, sizing or mixture removed from the wet web with suction boxes 139 and 141 may also be added to the mix tank 147 by way of return pipe 143. The mixed sizing, binder, or mixture of the two is then pumped with pump 153 to a holding tank 145 to supply an applicator pump 146 that meters the sizing, binder, or mixture of the two at the desired rate using variable valve 144 to the applicator 135.

Figure 5:
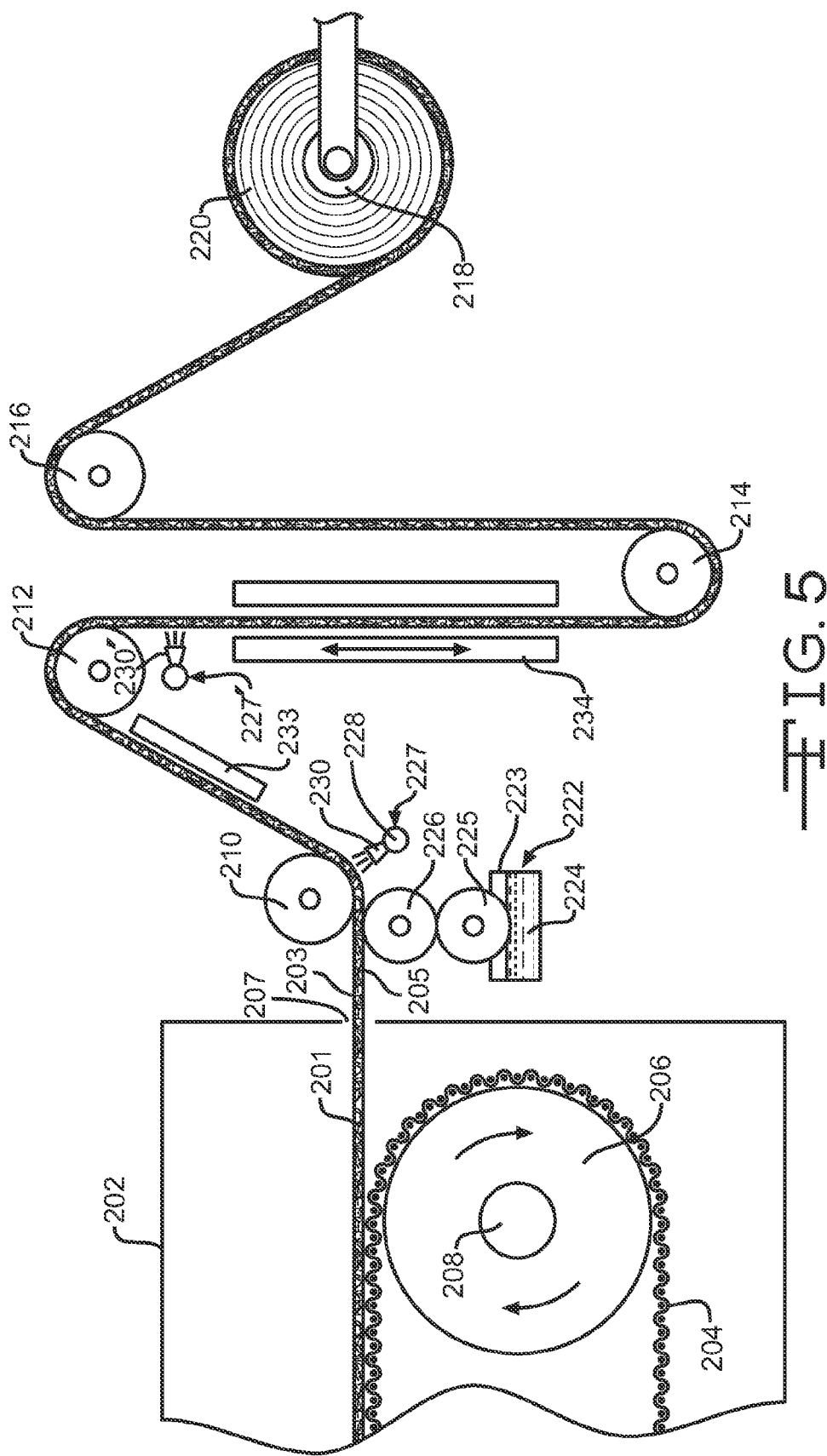
FIG. 5 is a f simplified schematic drawing of a portion of a nonwoven mat system showing an additional system for applying a one or more sizings to a nonwoven fiber mat or to a woven fabric according to embodiments of the invention.

In certain embodiments, a second sizing may be added to the fibers in a nonwoven mat or in a woven fabric. FIG. 5 shows another system useful in adding one or two sizing compositions to the reinforcement fibers in a nonwoven mat or a woven fabric. This system may be used as an alternative to the sizing application disclosed above in the description of FIG. 4, or in addition to that system to add a second sizing composition after the first sizing has been dried on the fibers in the nonwoven mat. For woven fabrics, the system of FIG. 5 may be used to add one or two different sizing compositions to the woven fabric as the fabric comes off of the loom, or in a separate step.

When used with the wet process in FIG. 4, a dryer chain/screen 204 carries the wet to dry, hot nonwoven mat 201 through the dryer 200 driven by a tail pulley 206 mounted on axle 208. The hot, dry mat 203 exiting the dryer may then be wound up into rolls 220 on a mandrel 218 supported by arms 219 of any type of winder, for example, an indexing winder. Other rolls 212, 216 and at least one movable accumulator roll 214 provide enough slack to allow the winder to doff the mat, rotate a finished roll 220 out of position and a fresh mandrel into winding position to start winding a new roll 220. Nonwoven mats may also be made by a dry process, and include dry chopped fiber mats and continuous filament mats.

Numerous methods may be used to produce dry fibers with two sizing steps separated by one or two drying steps. An exemplary method uses the process shown in FIG. 2. A first size is applied with the sizing applicator 6 shown. The sizing contains either a PI, a precursor(s) for a PI, an appropriate catalyst(s), or a precursor(s) for the catalyst(s) as described above. Following chopping in the chopper 16 and drying in the dryer 28, the dry chopped fibers exit onto a second belt or chain conveyor like 19 and pass under one or more spray heads where a second size is applied, then the second sized fibers pass into a second dryer like the dryer 28 and after exiting the second dryer the dry fibers fall onto the sorter 40, etc. If the first sizing applied contains one or more PI(s), or precursors of such, then the second size contains an appropriate catalyst, or appropriate precursor(s) of one or more catalysts and vice-versa.

Another two step sizing method comprises applying the first sizing with the sizing applicator 6 (FIG. 2) and then applying a second sizing using the dip tank 62 shown in FIG. 3, and following chopping or winding in the chopper or winder 67, the wound or chopped fibers are dried, either as shown in FIG. 2 when the fibers are chopped, or in an oven when wound.

A still further method involves sizing the fibers as shown in either of the processes shown in FIGS. 2 and 3, and then applying the second sizing as an ingredient in the binder applied to a wet web as shown at 35 in FIG. 4, or with the spray jets 27 and 27' shown in FIG. 5.

The woven or nonwoven fibrous mats may be very permeable due to the many relatively large pores in the surface and throughout the mats. The permeability of these mats is in the range of about 50 to about 1500. For example, the permeability of the mats may be in the range of about 175 to about 1000 or about 200 to about 800 cubic feet per minute per square foot (ASTM D737 test method).

Referring to FIG. 5, instances where the bottom surface of nonwoven mat, woven or nonwoven scrim and/or woven fabric 203, coming out of an oven 200 as the final step in the process of making such fibrous materials, may be coated with a size composition, such as using a roll over roll coater 223. In a roll-over-roll coater 223 a first roll 225 rotates in a pan 222 containing the liquid size 224, where the liquid may be for example, a water medium, and picks up a layer of the size 224 on the surface of the roll 225 and transfers the layer of size 224 to a second, coating roll 226. The coating roll 226 "kisses" the back side of the mat or fabric 203 transferring the size to the fibers, and optionally binder coated fibers, in the mat or fabric. The amount of size applied to the mat or fabric may be controlled by adjusting the concentration of the size 224 and by controlling the amount of liquid size picked up by the first roll 225. The size quickly is moved through the mat or fabric by the size wanting to wet the fibers, and then heating with one or more heaters 233 such as a hot air heater, drives off the water or solvent in the sizing, leaving the non-isocyanate PA on the fibers or the cured binder coating the fibers. The penetration of the surfactant into the mat or fabric to the opposite surface is complete by varying one or more of the non-isocyanate PI concentration in the size 224, the amount of size applied to the mat or fabric 203, the temperature of the hot air in the one or more dryers 233, and the speed of the tail pulley 206.

If additional or more size is desired on the mat or fabric than may be applied with the coater 223, one or more additional coating devices 227 may be used, either in place of the coater 223 or in addition to the coater 223. For example, one or more spray jet coaters 227 comprised of a manifold 28 and spaced apart jet nozzles 30 may be used. Jet nozzles that form a mist or atomize the size 224 may also be used. This system may also be used to apply a size containing one or more precursors for the non-isocyanate PI to the mat or fabric 203.

In the embodiments where the fibers in the mat or fabric 203 have a second size that contains a different non-isocyanate compound PI or precursor for such that is applied prior to final drying, a second set of size applicators 227" are shown followed by one or more secondary dryers 234. The dryers 233 and 234 may be located adjacent both surfaces of the mat or fabric 203 if desired. The dryers may be of any suitable type, such as hot forced air heaters, surface combustion heaters or infra-red heaters. In cases where size transfer does not matter, it is not necessary that the mat or fabric be completely dry prior to winding into the roll 220, or prior to stacking sheets of the mat or fabric together. Where it is beneficial to apply size 224 to the top surface of the mat or fabric 203, the application equipment is arranged to coat that side instead of the bottom side, using for example, jet spray applicators 227, 227".

When precursors for the PI(s) are used, the precursor compounds may retain their identity during the sizing formation, application on the fibers and/or flakes and during drying. All the precursors may not be in the same size composition— about half of the precursors are in the sizing composition and the other one or half are either supplied with the monomer during the composite making process or are in a sizing applied in an additional sizing process step to form the PI(s) on the fibers and/or flakes before the reinforced composite manufacturing process. This is illustrated in the following three examples.

EXAMPLE 1

A sizing formulation comprising of 1-10 wt. %, based on the weight of the sizing composition, of aminopropyltriethoxysilane, an equivalent molar amount of acryloyl caprolactam, 5 wt. % Neoxil 965 epoxy film former and 0.1-2 wt. % of a lubricant, for example a cationic lubricant such as any of Emery 6717, Emerest 2646 or 2661, are mixed together with water to form an aqueous mixture. The sizing is applied on glass fibers using a process as described above for FIG. 1 and the coated glass fibers are collected either in the form of rovings or chopped strands. The sized glass fibers are dried using dielectric (microwave) or convection drying. During the drying process the aminosilane and the acryloyl caprolactam undergo a Michael addition reaction to form a PI in situ on the surface of the glass fibers. The PI is capable of polymerizing caprolactam to form Nylon 6 in the presence of a catalyst. Alternatively, mercaptopropyltrimethoxysilane may be used instead of the aminosilane. Other amines or thiols may also be used. Also, alternatively, methacryloylcaprolactam may be used instead of acryloyl caprolactam.

EXAMPLE 2

This example is similar to example 1, but in this case, the second precursor, namely acryloyl/methacryloyl caprolactam is not added to the primary sizing formulation. A secondary sizing application is used either before or after drying the glass fibers as described above. In the secondary sizing application, the second precursor is applied and the PI is then formed by Michael addition as described above.

EXAMPLE 3

This example is similar to Example 2, but after the first precursor is applied to the glass fibers, the sized glass fibers are collected in the form of wet chopped strands. The wet, sized chopped glass fiber strands are then processed in a wet-laid process as described above to form a non-woven glass fiber mat. During the binder application step of the non-woven process, the second precursor is applied in or separately of the binder. Upon drying of the mat, the PI is formed by Michael addition. The second precursor may also be applied by a secondary spray process to the hot, dry fiber mat at the end of the mat dryer as described above.

EXAMPLE 4

Glass fibers are sized with one PI precursor using the process described in Example 1 above. The precursor may be chosen from a variety of compounds including Michael acceptors/donors, esters, lactams, etc. Specific examples include amino/mercaptosilanes, other amines/thiols, esters such as ethyl benzoate, etc. The second PI precursor is then supplied during the composite manufacturing process. For example, glass fibers sized with aminopropyltriethoxysilane in the form of a woven fabric or non-woven mat is placed in a mold for the RTM process. Caprolactam monomer along with a catalyst is injected into the mold. The second precursor, such as acryloyl/methacryloyl caprolactam is supplied along with the monomer-catalyst mixture. The PI is formed in situ in the mold and subsequently Nylon 6 polymer is formed.

In a modified embodiment, the glass fibers are sized with Ethyl Benzoate and are processed similar to the above example. In this case, caprolactam monomer itself acts as the second PI precursor and benzoyl caprolactam PI forms in situ in the mold in the presence of sodium caprolactam catalyst.

Other specific embodiments are provided below in the following examples.

EXAMPLE 5

Caprolactam monomer flakes/pellets are fed to a molding compound extruder where it is heated and melted in the first one or two zones to about 80° C. to about 120° C. Either mixed with the caprolactam pellets or added part way down the extruder are N-acetyl caprolactam PA in an amount of about 6 mols of the PA per mol of caprolactum and a catalyst, magnesium bromide-caprolactam in an amount of about 1 mol of the catalyst per kilogram of caprolactam. Since polymerization begins in the extruder, this is a reactive extrusion method. The extrudate is then used as feed for a reactive injection molding system or as slugs for BMC molding to make unreinforced Nylon 6 parts or products having good properties and performance.

EXAMPLE 6

This example is a modification of Example 5 in that reinforcement fibers, E glass fibers having a length of about 5 mm to about 40 mm and an average diameter in the range of about 8 microns to about 20 microns were added to the molten mixture part way down the extruder in an amount in the range of about 20 wt. percent to about 50 wt. percent, based on the weight of the molded parts, to produce a feed for molding in a reactive injection molding system using preheated and/or removable molds.

The extrudate may also be used in a BMC system to make fiber reinforced Nylon 6 parts and products having excellent properties and performance. In either molding system, the preheated molds begin polymerizing the monomer(s) that are against the heated mold surface and in the outer shell of the formed shape. The molds may then be shuttled into a press to polymerize under pressure and the desired temperature. The desired shape is de-molded either after sufficient polymerization has taken place that the de-molded shape is stable, or after at least 90 percent of the monomer(s) have been polymerized. In the option of early de-molding, the de-molded shape is maintained in an environment of at least about 130° C. to about 190° C. until at least about 90 percent of the polymerization is complete. Some advantages of this method are that the mixing head does not have to be cleaned very often and many different kinds of reinforced thermoplastic Nylon-6 parts and/or products may be made using this method.

EXAMPLE 7

This example is a modification of Example 6 in that reinforcement fibers, E glass fibers having a length of about 5 mm to about 40 mm and an average diameter in the range of about 8 microns to about 20 microns, and having the PI, or precursor(s) of the PI on the surface of the fibers made with any of the systems shown in FIGS. 1, 2 and 3 and described above, including the optional or alternative features, were added to the molten mixture part way down the extruder in an amount in the range of about 20 wt. percent to about 50 wt. percent, based on the weight of the molded parts, to produce a feed for molding in a reactive injection molding system or in a BMC system to make fiber reinforced Nylon 6 parts and products having excellent properties and performance. In this example it was not necessary to add the PA compound to the extruder because it came in with the fibers. This had the effect of beginning of the polymerization process in the extruder.

EXAMPLE 8

Glass fibers (E glass) having a diameter of about 8 to about 20 microns are sized with a size composition of about 10 to about 90 wt. percent water, about 1 to about 5 wt. percent of a lubricant for glass fiber sizing compositions, and 1 to about 30 wt. percent of amino/mercapto silane precursor using the system shown in FIG. 1 to make gun roving product. The amount of amino/mercapto silane on the dried fibers amounted to about 0.05 to about 5 wt. percent, based on the dry weight of the sized glass fibers. A perform was made using a gun roving process for making performs. The preform was preheated to about 80° C. to about 160° C. and placed in a RTM mold heated to about 140° C. to about 180° C. A heated liquid mixture at about 80° C. to about 140° C. of caprolactam containing about 4 to about 10 millimoles of MgBr catalyst and about 0.5 to about 5 wt. percent of acryloy/methacrylovl caprolactam initiator/precursor was then injected into the mold impregnating the fiber perform after which the silane reacted in situ with the acryloyl/methacryloyl caprolactam initiator/precursor to form an initiator bonded to the surface of the glass fibers via Si—O—Si bonds. The caprolactam and catalyst reacted in situ forming bonded initiator to polymerize the caprolactam at a temperature in the range of about 140° C. to about 180° C. to produce glass fiber reinforced polyamide 6 composite parts having good properties and performance. The amount of sized glass fibers in the parts made in this manner ranged from about 30 wt. percent to about 90 wt. percent. Other non-isocyanate PI compounds may be used in the size of Example 1 instead of amino/mercapto silane PI.

Any of the different types of sized, reinforcement fiber products of the present embodiments requiring only one fiber size application may be made using the size composition of Example 5 and any of the processes described above for making sized fiber products. The lubricant is not an essential ingredient in the size composition of Example 5, but is essential for optimum strength performance for most fiber reinforced composite products. Further, the sizing may also contain one or more wetting agents or surfactants and/or one or more film formers.

EXAMPLE 9

Glass fibers (E glass) having an average diameter of about 8 to about 20 microns were sized with a size composition containing about 10 to about 90 wt. percent water, about 1 to about 20 wt. percent of ethyl benzoate ester and about 0.1 to about 5 wt. percent of a lubricant used in glass fiber sizing compositions in a system as shown in FIGS. 4 and 5 to make a nonwoven glass fiber mat containing about 0.5 to about 5 wt. percent of sizing solids on the surfaces of the fibers in the nonwoven mat. Preforms were fabricated from this nonwoven mat, preheated to about 80° C. to about 160° C. and placed in a mold in an VARTM machine, the mold heated to about 140° C. to about 180° C. The mold and perform were evacuated to a partial pressure of about 5 to about 20 psi gauge and a liquid mixture of caprolactam and an excess, about 0.5 to about 5 wt. percent of MgBr-caprolactam catalyst, heated to a temperature of about 80° C. to about 140° C. was pumped/pulled into the partially evacuated mold to impregnate the hot perform, surround the fibers and fill the hot mold after which an in situ reaction of the ethyl benzoate ester with the caprolactam in the presence of the catalyst generated benzoyl caprolactam initiating polymerization of the caprolactam producing a glass fiber reinforced polyamide 6, Nylon 6, composite part having good properties and performance.

The amount of sized glass fibers in the parts made in this manner ranged from about 30 wt. percent to about 90 wt. percent. An excess of catalyst may be used to drive both the in situ reactions forming the PA and the polymerization of the caprolactam. The excess level is dictated by the amount of ester present on the glass as part of the sizing solids. About 5 to about 20 percent of catalyst (molar basis with respect to caprolactam) may be used to synthesize the benzoyl caprolactam initiator in situ.

Other non-isocyanate, ester PI compounds may be used in the size of Example 1 instead of ethyl benzoate ester PA including mono and multifunctional esters of aliphatic acids such as acetic, butyric, hexanoic, succinic, adipic, citric, poly acrylic, poly methacrylic, etc. as specific examples and specific examples of acid include ethyl acetate and diethyl adipate. One example of aromatic esters include diethyl phthalate.

Any of the different types of sized, reinforcement fiber products of the present embodiment requiring only one fiber size application may be made using the size composition of Example 5 and any of the processes described above for making sized fiber products. The lubricant is not an essential ingredient in the size composition of Example 5, but is essential for optimum strength performance for most fiber reinforced composite products. Further, the sizing may also contain one or more wetting agents or surfactants and/or one or more film formers.

EXAMPLE 10

Referring to FIG. 6, continuous, dry, E glass fiber strands 310, the glass fibers in the strands 310 having been previously sized with a sizing composition comprising an amount of amino-mercapto silane within the range suitable disclosed above and an amount of one or more glass fiber lubricants used in glass fiber sizings, are pulled from a plurality of roving packages on racks (not shown) by the puller rolls 332, 334 in the system. The glass fibers in this example are E glass fibers having an average diameter of about 20 micron. The glass fiber strands 310 are pulled over a multi-grooved guide roll 312 supported on a free wheeling axle 314 with one or more strands 310 being in each groove to spread out the strands 310 into a horizontal array 316 suitable for impregnation with a monomer-catalyst mixture. The strand array 316 is then passed over the top of a multi-grooved roll 318 similar or like the multi-grooved roll 314, also supported by a free-wheeling axle 320 and then the strand array 316 is pulled into a container 321. Optionally the fiber strand array 316 may be preheated by passing through an optional oven 319 to preheat the fibers to at least 100° C. or higher, up to a temperature in the range of about 120° C. to about 190° C. before entering the container 321. The container 321 is optionally heated and receives a monomer mix 322 that may be preheated to at least 100° C. or higher, up to a temperature in the range of about 120° C. to about 140-190° C. before entering the container 21. The monomer mix 322A comprises caprolactam monomer, magnesium bromide-caprolactam catalyst, and acryloyl/methacryloyl caprolactam initiator/precursor described above.

The temperature of monomer mix 322A in the container 321 is maintained or further heated in the container 321 with a heating means to a temperature of at least about 100° C. and up to about 130° C. to about 140-190° C. The silane will react in situ with the acryloyl/methacryloyl caprolactam to produce an initiator for bonding to the glass fiber surfaces as described in Example 4. The acryloyl/methacryloyl caprolactam may initiate the polymerization of caprolactam by itself, so care should be taken to avoid premature polymerization prior to contact with the fibers. The resultant very low viscosity heated monomer mixture 322 will rapidly impregnate the strands 310 and coat the fibers in the strands 310 with the monomer mixture 322A to form at least partially coated fiber strands 323 that may be pulled against one or more rods 324 in the container of monomer mixture 322A to spread out the fibers in the partially coated fiber strands 323 and to produce the fully coated fiber strands 325. The fully coated fiber strands 325 are then pulled out of the heated monomer mixture 322A by pulling them over a rod 326 after which they are pulled into and through a mold 328 having a tunnel profile according to the desired cross section profile of the molded part or product. At least an upstream length section 328A of the mold 328 is maintained at a temperature in the range of about 150 to about 190° C. and is sufficiently long such that the conditions within at least an exterior portion of the profile comprising a plurality of the fully coated fiber strands 325 reach a completion of an anionic ring-opening polymerization of the caprolactam in about 4 to about 10 minutes.

A resulting glass-reinforced Nylon-6 interim product 330 is then pulled from the mold 328 with opposed driven pulling rollers 332 and 334 mounted on axles 333 and 336 respectively. The driven pulling rollers 332,334 provide the pulling force for the entire process. Optionally, a final length section 329 of the mold 328 may be cooled to a temperature such that an exterior portion of the interim product 330 has stiffer surfaces for the driven puller rolls 332,334 to pull against. The interim product 330 is then cut into desired lengths using a rotating saw blade 338 mounted on a driven axle 337, or with other cutting devices, to form fiber reinforced Nylon-6 parts or products 339. If necessary, or desired, the parts and/or products 339 may be further processed in an oven (not shown) to complete the polymerization of any monomer mixture in the interior portion of the product 339, and/or in a cooling chamber (not shown) to cool the product 339 to a desired temperature. Alternatively, the cutting of the interim product 330, such as with the cut off rotating saw blade 338, may be conducted following the final heating and/or cooling steps.

Thus, any profile shape and length made using the pultrusion process may be used to make fiber reinforced thermoplastic Nylon 6 parts and/or products in which at least about 90 percent of the precursor monomer is polymerized in the pultrusion process.

EXAMPLE 11

Embodiments also include modified filament winding methods for making reinforced thermoplastic composite products. FIG. 7, shows a front schematic view of a filament winding system modified to practice the present embodiments. Continuous, dry E glass fiber strands and/or strips of E glass woven or nonwoven scrim, nonwoven mat and/or fabric 440 are pulled from a plurality of roving packages on racks (not shown) and/or from rolls supported on rotating mandrels (not shown) by the puller roll 462 in the system, a rotating mandrel 462, forming fiber reinforced Nylon 6 parts or product 466, to be described in more detail later. The glass fibers in the strands and/or strips 440 may be previously sized, or bonded together, with a sizing or binder composition comprising an amount of ethyl benzoate, or similar ester as a precursor for a PA for caprolactam, within the suitable range disclosed above, and an amount of one or more glass fiber lubricants used in glass fiber sizing compositions, The glass fibers in this example are E glass fibers having an average diameter in the range of about 8 to about 23 microns. The glass fiber rovings or strands/strip(s) 440 are pulled over a multi-grooved guide roll 442 supported on a free wheeling axle 444 with one or more strands/strips 440 being in each groove of the grooved roller 442 to spread out the strands/strips 440 into a horizontal array 446 suitable for impregnation with a monomer-catalyst mixture. The strand array 446 is then passed over the top of another multi-grooved roll 448 similar or like the multi-grooved roll 444, also supported by a free-wheeling axle 449 and then the strand array 446 is pulled into a container 453. Optionally the fiber strand array 446 may be preheated by passing through an optional oven 450 to preheat the fibers to at least 100° C. or higher, up to about 170-200° C. to produce heated glass fibers/strip(s) 451, before entering the container 453.

The container 453 is optionally heated and contains a monomer mix comprising a mixture of caprolactam and an excess of a catalyst that will react in situ with the PA on the surfaces of the glass fibers to form benzoyl caprolactam PA to initiate the polymerization of the caprolactam to Nylon 6. This monomer/catalyst mix 455 may be preheated prior to entering the container 453, and maintained at the entering temperature or further heated in the container 453 with a heating means to a temperature of at least about 100° C. and up to about 130° C. to about 140° C.

No detrimental amount of polymerization build-up will occur in the container 453 and resident monomer mixture 455 of the monomer because any polymerization that does occur in the container 453 will take place on the fibers in the rovings 440 and will be carried out of the container 453 with fully coated fiber strands 459. This resultant very low viscosity heated monomer mixture 455A will rapidly impregnate the strands/strip(s) 446 or heated strands/strip(s) 451 and coat the fibers in the strands/strip(s) 446 with the monomer mixture 455 to form partially coated fibers 456 that may be pulled against one or more rods 457 in the container of monomer mixture 455 to spread out the partially coated glass fibers 456 in the strands 446 or 451 and to produce fully coated fibers in the fiber strands/strip(s) 459.

The fully coated fiber strands/strip(s) 459 are then pulled out of the heated monomer mixture 455 by pulling them over a rod 460 after which they are pulled onto the rotating mandrel or form 462, that may be heated to a temperature in the range of about 150° C. to about 190° C. with any suitable heaters 465. The rotating mandrel or form 462 is supported and driven by driven rotating supports 464, one of such supports 464 connected to each end of the mandrel or form 462 at its horizontal axis. Rapid polymerization may begin as soon as the heated and fully coated fiber strands/strip(s) 459 contact a rotating heated mandrel or form 462, or previously laid down material 466 heated by the heated mandrel or form 462. Alternatively, or in addition, when formation of the desired shape is completed, the entire mandrel or form 462 and/or formed product may be removed from the supports 464, or from the mandrel or form 462 and placed in a hot oven to complete the polymerization to a point where at least 90 percent of the monomer has been polymerized. Completion of the anionic ring-opening polymerization of the caprolactam may take about 4 to about 10 minutes at the above described rapid polymerization temperature range. Instead of, or in addition to, internal heaters for heating the mandrel or form 462, one or more external heaters 465, such as convection heaters, radiation heater(s), IR heaters, may be spaced from portions, or most of, the mandrel or form 462 and the interim product 466. In the above-described system, all of the elements 442 through 460 may shuttle back and forth along the length of the mandrel or form 462 at a desired speed to produce a desired pattern of fiber strands/strip(s) in the formed glass fiber reinforced Nylon-6 product.

Using this method, very large, continuous glass fiber reinforced thermoplastic pipes, tanks, or other hollow shapes may, for the first time, be rapidly made at a relatively low cost and superior quality and performance compared to previous methods for forming reinforced polymer parts or products made by filament winding.

Products made according to the present methods may also contain one or more pigments, fillers, and other additives by including such in the monomer mixtures. In addition to normal size parts made by methods for making reinforced thermoplastic composites, very large parts and/or products may be made using the present methods, such as large body parts, floor pans and high-end thermoplastic composites for applications including wind turbine blades, aircraft parts, automotive parts, pipe and reinforced pressure vessels, tanks, etc.

A multitude of other embodiments are possible including, but not limited to, using reactive fillers and pigments in place of or in addition to the reactive fibers and/or flakes and with non-reactive fibers and/or flakes. The fibers, flakes, filler particles and pigment particles may be of any material used to reinforce, stabilize and/or color and/or to texture thermoplastic composite parts or products.

What is claimed is:

1. A method of making a reinforced thermoplastic composite from sized fibers or particles, the method comprising:
    forming the sized fibers or particles from a sizing solution comprising at least one non-isocyanate-containing polymerization initiator (PI) for initiating the polymerization of caprolactam monomers, at least one precursor for a non-isocyanate-containing PI for initiating the polymerization of caprolactam monomers, or both, wherein:
        the PI does not contain a silicon-containing coupling moiety;
    forming a mixture by introducing the sized fibers to a binder solution comprising one or more types of caprolactam monomers and one or more catalysts operable to catalyze the polymerization of the caprolactam monomers when they are brought into contact with the PI or the precursor of the PI proximate to a surface of the sized fibers or particles; and
    increasing a temperature of the mixture to a polymerization temperature or above, wherein the caprolactam monomers polymerize into a polyamide binder component of the reinforced thermoplastic composite.

2. The method of claim 1, wherein the at least one non-isocyanate-containing PI for initiating the polymerization of caprolactam monomers comprises
    reaction products of acryloyl/methacryloyl caprolactam with amines/thiols, N-acetyl caprolactam, isophthaloyl-biscaprolactam, benzoyl caprolactam, caprolactam esters, acryloyl caprolactam, or methacryoyl caprolactam.

3. The method of claim 1, wherein the non-isocyanate-containing PI is selected from the group consisting of:
    thiols-acryloyl caprolactam;
    thiols-methacryloyl caprolactam;
    amines-acryloyl caprolactam;
    amines-methacryloyl caprolactam;
    ethyl benzoate-caprolactam;
    esters-caprolactam;

Michael acceptors and Michael donors that combine to form the structure depicted by:

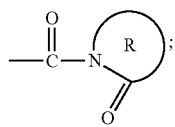

condensation reaction of lactams with a suitable precursor molecule to form the structure depicted by:

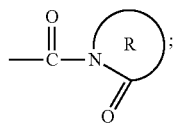

and mixtures thereof.

4. The method of claim 1, wherein the sized fibers or particles comprise both fibers and flakes.

5. The method of claim 1, wherein the sized fibers or particles comprise glass fibers, and the reinforced thermoplastic composite is a glass-fiber-reinforced composite.

6. The method of claim 1, wherein the mixture is increased to a polymerization temperature of about 130° C. to about 200° C.

7. The method of claim 5, wherein the mixture has a temperature of about 100° C. or less before increasing the temperature to the polymerization temperature.

8. The method of claim 1, wherein the one or more catalysts comprise a magnesium bromide caprolactam catalyst.

9. The method of claim 1, wherein the polyamide binder component comprises nylon 6.

10. The method of claim 1, wherein the PI has a structure comprising

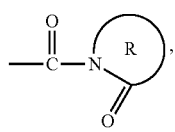

wherein

represents a $C_3$ to $C_{12}$ substituted or unsubstituted cyclic hydrocarbon chain.

11. A method of making a reinforced thermoplastic composite from sized fibers or particles, the method comprising:
forming the sized fibers or particles from a sizing solution comprising a polymerization compound, wherein the polymerization compound comprises a first precursor, wherein the first precursor is not a polymerization initiator (PI);
forming a mixture by introducing the sized fibers to a binder solution comprising one or more types of caprolactam monomers, a catalyst operable to catalyze the polymerization of the caprolactam monomers, and a second precursor, wherein the second precursor is not a PI;
reacting the first precursor with the second precursor to form a PI for initiating the polymerization of caprolactam monomers, wherein:
the PI does not contain an isocyanate, and
the PI does not contain a silicon-containing coupling moiety; and
increasing a temperature of the mixture to a polymerization temperature or above, wherein the caprolactam monomers polymerize into a polyamide binder component of the reinforced thermoplastic composite.

12. The method of claim 11, wherein the PI for initiating the polymerization of caprolactam monomers comprises reaction products of acryloyl/methacryloyl caprolactam with amines/thiols, N-acetyl caprolactam, isophthaloylbiscaprolactam, benzoyl caprolactam, caprolactam esters, acryloyl caprolactam, or methacryoyl caprolactam.

13. The method of claim 11, wherein the PI is selected from the group consisting of:
thiols-acryloyl caprolactam;
thiols-methacryloyl caprolactam;
amines-acryloyl caprolactam;
amines-methacryloyl caprolactam;
ethyl benzoate-caprolactam;
esters-caprolactam;
Michael acceptors and Michael donors that combine to form the structure depicted by:

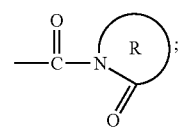

condensation reaction of lactams with a suitable precursor molecule to form the structure depicted by:

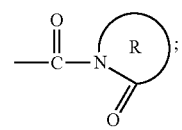

and mixtures thereof.

14. The method of claim 11, wherein the sized fibers or particles comprise both fibers and flakes.

15. The method of claim 11, wherein the sized fibers or particles comprise glass fibers, and the reinforced thermoplastic composite is a glass-fiber-reinforced composite.

16. The method of claim 11, wherein the mixture is increased to a polymerization temperature of about 130° C. to about 200° C.

17. The method of claim 11, wherein the mixture has a temperature of about 100° C. or less before increasing the temperature to the polymerization temperature.

18. The method of claim 11, wherein the catalyst comprises a magnesium bromide caprolactam catalyst.

19. The method of claim 11, wherein the polyamide binder component comprises nylon 6.

20. The method of claim 11, wherein the first precursor comprises an acryloyl caprolactam or a methacryloyl caprolactam.

* * * * *